United States Patent
Zafarana et al.

(10) Patent No.: US 8,368,371 B2
(45) Date of Patent: Feb. 5, 2013

(54) METHOD FOR CONTROLLING AN INTERLEAVING MULTIPHASE CONVERTER AND CORRESPONDING CONTROLLER

(75) Inventors: Alessandro Zafarana, Milan (IT); Osvaldo Zambetti, Milan (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 415 days.

(21) Appl. No.: 12/797,967

(22) Filed: Jun. 10, 2010

(65) Prior Publication Data

US 2010/0315049 A1   Dec. 16, 2010

(30) Foreign Application Priority Data

Jun. 10, 2009 (IT) ................ MI2009A1025

(51) Int. Cl.
*G05F 1/00* (2006.01)

(52) U.S. Cl. ............... 323/282; 323/286; 363/65

(58) Field of Classification Search .......... 323/222, 323/224, 259, 272, 282–290, 225; 363/16–17, 363/21.01, 21.13, 21.18, 97, 87, 132, 56.03, 363/65

See application file for complete search history.

(56) References Cited

U.S. PATENT DOCUMENTS

| | | | | |
|---|---|---|---|---|
| 6,166,527 A | * | 12/2000 | Dwelley et al. | 323/222 |
| 6,356,063 B1 | * | 3/2002 | Brooks | 323/284 |
| 6,605,931 B2 | * | 8/2003 | Brooks | 323/272 |
| 6,965,219 B2 | * | 11/2005 | Brooks et al. | 323/282 |
| 7,211,992 B2 | * | 5/2007 | King | 323/283 |
| 2004/0095104 A1 | | 5/2004 | Brooks | |

FOREIGN PATENT DOCUMENTS

| | | | |
|---|---|---|---|
| EP | 1 826 892 A | | 8/2007 |
| EP | 1 826 893 A | | 8/2007 |
| EP | 1 826 894 A | | 8/2007 |

OTHER PUBLICATIONS

International Search Report Application No. MI200910025, Jan. 12, 2010, Munich, Italy.

* cited by examiner

*Primary Examiner* — Rajnikant Patel

(74) *Attorney, Agent, or Firm* — Lisa K. Jorgenson; Stephen Bongini; Fleit Gibbons Gutman Bongini & Bianco P.L.

(57) ABSTRACT

A method is provided for controlling a converter of the multiphase interleaving type. According to the method, there is detected when a change of a load applied to an output terminal of the converter occurs. When detected, all of the phases of the converter are simultaneously turned off by the generation of suitable PWM driving signals. The PWM driving signals are controlled so as to force the turn-on of the phases at the same time and to zero a time phase shift of driving of the interleaving type of the PWM driving signals. The interleaving of the driving time phase shift is recovered and a normal operation of the converter is restarted. A controller for controlling a converter of the multiphase interleaving type is also provided.

24 Claims, 15 Drawing Sheets

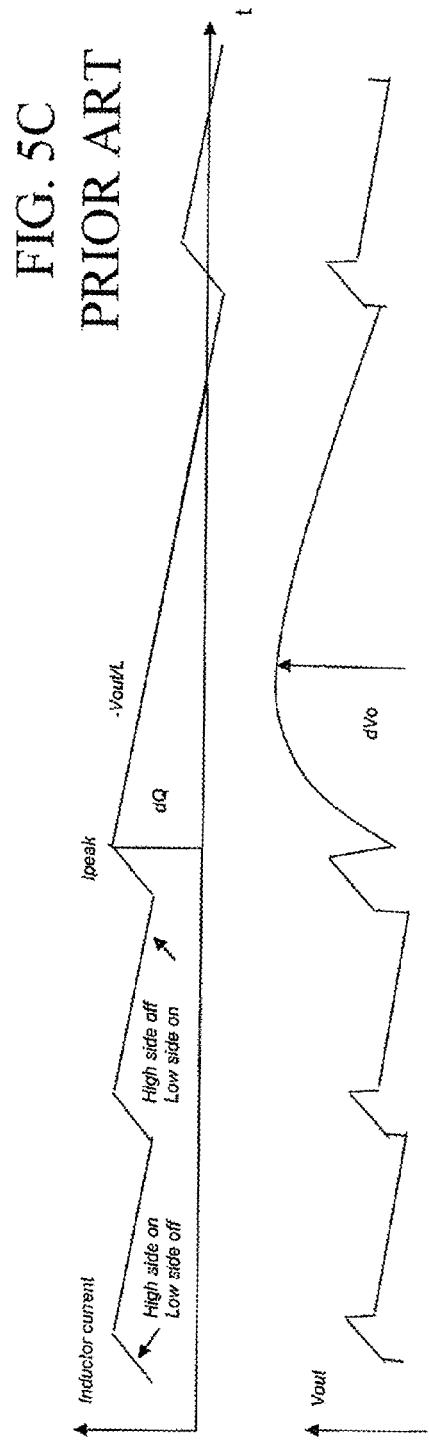
FIG. 5A PRIOR ART
FIG. 5B PRIOR ART
FIG. 5C PRIOR ART
FIG. 5D PRIOR ART

METHOD FOR CONTROLLING AN INTERLEAVING MULTIPHASE CONVERTER AND CORRESPONDING CONTROLLER

CROSS-REFERENCE TO RELATED APPLICATIONS

This application is based upon and claims priority from Italian Patent Application No. MI2009A 001025, filed Jun. 10, 2009, the entire disclosure of which is herein incorporated by reference.

FIELD OF THE INVENTION

The present invention relates to electronic circuits, and more particularly to methods and devices for controlling a converter of the multiphase interleaving type.

BACKGROUND OF THE INVENTION

As is well known, the evolution of the electrical features of the processors for PCs, workstations, and servers obliges manufacturers to come up with new solutions to meet the requirements demanded by the central processing units (or "CPUs").

In particular, a CPU of the new generation requires a high precision in the supply voltage, equal for example to +/−0.8% under steady state and +/−3% under transient conditions.

Beside these precision requirements, the supply voltages that are used decrease to 1.1V and the load currents increase up to 130 A with edges of 100 A/μs, with a requirement for efficiency higher than 80%.

Suitable current or voltage controller devices that are able to ensure the required efficiency must be used. A controller device suitable for CPU applications comprises, for example, a converter of the DC-DC interleaving type, used as an economic and efficient solution to meet the above needs and obtained by connecting in parallel N DC-DC converters in Buck or Step-down configuration (i.e., by connecting their input and output terminals to each other driven in and out of phase or interleaved mode).

Such a converter of the DC-DC interleaving type is shown in FIG. 1A. The converter 1 essentially comprises a controller 2 coupled to n buffers or phases 3 (multiphase configuration), which comprise pairs of switches, High Side and Low Side, driven by the controller 2 so as to supply a required power to a CPU 4, which is coupled to the output terminal OUT of the converter 1.

The interleaving driving of the converter 1 also implies that the controller 2 closes the High Side switches of the n phases with a phase shift equal to the switch period T divided by the number of n phases.

A multiphase interleaving converter is shown in greater detail in FIG. 1B. As shown, the converter 1 comprises n phases (indicated in the figure simply by their inductors L), with each phase 3 comprising a High Side switch SWhs coupled in series with a Low Side switch SWls between first and second voltage references, in particular an input voltage Vin and ground GND.

Each phase 3 also comprises an inductor L coupled between a switch node X, or phase node, that is intermediate between the switches SWhs and SWls and the ground GND. The converter 1 also comprises an output capacitor Cout connected between the output terminal OUT and the ground GND. Across the capacitor Cout there is an output voltage value Vout which is applied to the CPU 4.

The controller 2 supplies a driving signal of the PWM type for the High Side switches SWhs and the Low Side switches SWls of the phases 3, which are sensitive to the level of the signal PWM. In particular the High Side switches are on and the Low Side switches are off if PWM=1, and vice versa the High Side switches are off and the Low Side switches are on if PWM=0. For this purpose, the controller 2 comprises a suitable modulator 5.

In recent years a great increase in the current rate has been requested by the processors (Istep/Irise), which greatly complicates the design of these DC-DC interleaving converters.

It is thus probable that the DC-DC interleaving converters of the next generation will be required to meet more and quicker load changes ("Load Transient").

All this implies an increase in the costs of these converters for which it is necessary to increase the number of output capacitors Cout, and thus the number n of phases of the converter itself to meet the voltage tolerances requested.

In particular, if up to now the number n of phases has been selected according to efficiency, temperature of the components (i.e., reliability), and power density requirements, in the following years the number of phases will be established also according to the required current speed specifications that need to be achieved.

Increasing the number of phases is in fact a way to increase the response speed of the converter.

Clearly, for current changes equal to 70 A in a range of 50 ns, only an adequate number of ceramic capacitors can limit the voltage fall of the processor in the first 50 ns of the load transient. The regulator has a band, which is proportional to n×Fsw, with n being the number of phases of the converter and Fsw being the switching frequency, in general about 300 kHz. Thus, there are obtained response times that are in inversely proportional to the band (for example, for n=4 a response time of about 800 ns is obtained).

The converter and its response speed can thus heavily influence its manufacturing cost and the number of electrolytic capacitors to be used (which are in turn correlated to the output voltage fall for the processor over longer times with respect to the ceramic capacitors).

Band and response speed of the converter are, however, two indexes which no longer function for short load transients such as 50 ns, which can not be considered a "small signal" shifting any more since the reaction times of the closed loop system (i.e., the band) are greater by at least one order of magnitude.

Known solutions aim at improving the response times of the controller without influencing its band. An example of this type of known solution is shown in FIG. 2.

The controller 20 has a terminal OUT, for its connection with a CPU, that supplies a voltage signal Vout. The terminal OUT is coupled to a first inner terminal FB by a resistor Rfb. The controller 20 also comprises an error amplifier EA having a first inverting input terminal coupled to the first inner terminal FB and to a first current generator Gdroop suitable for supplying this first input terminal of the error amplifier EA with a voltage value Idroop equal to $K^*I_{TOT}$, with K being a suitable scale factor and $I_{TOT}$ being a total value of the current flowing in the inductors of the phases of the converter to which the controller 20 is coupled.

The error amplifier EA has a second non-inverting input terminal that receives a reference voltage Ref, and an output terminal coupled to a second inner terminal COMP of the controller 20, which is, in turn, feedback coupled to the first inner terminal FB by the series of a resistor Rf and a capacitor Cf.

The second inner terminal COMP is coupled to multiple control modules 21 that are connected in parallel and each have an output terminal O coupled to a phase of the converter.

In particular, each control module 21 is coupled between first and second voltage references, in particular a supply voltage Vdd and ground GND, and is coupled to the second inner terminal COMP.

A generic control module 21 comprises a resistor Rs and a capacitor Cs, which are connected in parallel between the second inner terminal COMP and an inner node Y of the module itself, which is, in turn, coupled to ground GND by a biasing generator Gp, which supplies a current value equal to $K*I_L$, where K is the scale factor and $I_L$ is a value of the current which flows in the inductor L of the phase that is coupled to the control module 21.

In parallel to the capacitor Cs, the control module 21 comprises an input generator Gi, coupled between the supply voltage reference Vdd and the inner node Y, and suitable for supplying a current value equal to $K*I_{AVG}$, where K is the scale factor and $I_{AVG}$ a value of the currents which flow in the inductors L of the phases of the converter.

The inner node Y is also coupled to a first non-inverting input terminal of an operational amplifier OA of the control module 21, which also has a second inverting input terminal that receives a ramp signal RAMP (having frequency Fsw) and an output terminal O, which is coupled to a corresponding phase of the converter and supplies this phase with a driving signal PWM.

To improve the response times of the controller 20 without modifying its band, a supplementary capacitor Cd is coupled between the first inner terminal FB and the terminal OUT, in parallel to the resistor Rfb.

In this way, when there is a particularly quick Load Transient, this supplementary capacitor Cd becomes a much smaller impedance than the resistor Rfb, resulting in the voltage value at the first inner terminal FB being no longer latched at a value equal to the reference voltage Ref (virtual ground due to the gain of the error amplifier EA) but is dragged by the voltage signal Vout present on the terminal OUT of the controller 20. The output terminal of the error amplifier EA, corresponding to the second inner terminal COMP, thus suddenly increases upwards with a speed proportional to the parameter GBWP (Gain Bandwidth Product) of the error amplifier EA and it saturates beyond the height of the PWM driving signals produced by the control modules 21.

In FIG. 2, the index j indicates the different phases of the converter coupled to the controller 20, which phases, as has been described, comprise a High Side switch SWhs coupled between an input voltage Vin and a switch node X, also called phase node, and a Low Side switch SWls coupled between the phase node X and the ground GND, as well as an inductor L coupled between the phase node X and the terminal OUT of the converter 1 on which an output voltage value Vout is present, as well as a capacitor Cout coupled between the terminal OUT and the ground GND.

The PWM driving signals set the turn-on and turn-off times of the switches SWhs and SWls. In particular, when the driving signal PWM is at a high value, or "1", then the High Side switch SWhs is closed and the Low Side switch SWls is open. In a dual way, if the driving signal PWM is at a low value, or "0", then the High Side switch SWhs is open and the Low Side switch SWls is closed.

Due to the configuration of the controller 20 shown in FIG. 2, the current $I_L$ which flows in each inductor L of each phase of the converter is read by the controller 20 through the scale factor K.

Although advantageous under several aspects, this known solution has two important problems.

1) Even if the controller 20 realizes a sudden and quick movement of the inner terminal COMP (further to a Load Transient), each phase responds in reality only marginally to this Load Transient and does not completely contribute to sustain the voltage value Vout required at the output due to the presence of the interleaving phase shifts of the phases themselves.

2) The speed with which the inner terminal COMP moves (a function of the parameter GBWP of the error amplifier EA) impacts how quickly the phases driven by the controller 20 are turned on or are turned on again further to a Load Transient.

It is immediately observed that the first problem is linked to the choice of the time constant of the controller 20, which is equal to Cd*Rfp, where the value of the resistor Rfb is chosen so as to program a desired droop effect (i.e., a departure of the voltage signal Vout from a reference value given by $K*I_{TOT}*Rfb$, with K being generally chosen so as to determine a maximum possible value of supplied current), and the value of the supplementary capacitor Cd is chosen as high as possible so as to reduce the impedance of the parallel connection between itself and the resistor Rfb in case of a Load Transient.

However, if the value of the supplementary capacitor Cd is too high, its derivative action also occurs in the steady state (i.e., in the absence of a Load Transient, by substantially amplifying the ripple of the voltage Vout, which is a signal with a value equal to about 10 mV and recurring at frequency n*Fsw, with n being the number of phases of the converter). If this occurs, the converter becomes unsteady.

In other words, for a correct operation of the controller 20 the following relation is to be respected.

$$\frac{1}{2\pi Rfb*Cd} > n*Fsw$$

where Rd is the resistance value of the resistor Rd, Cd is the capacitance value of the capacitor Cd, and n*Fsw is the frequency of the signal Vout.

All this limits the movement of the inner terminal COMP for which each phase with driving signal PWM higher than a control voltage at the instant when there is a Load Transient is only marginally turned on, as shown in FIG. 3.

In particular, in this figure it is shown how the current of the inductor of the phase F4 is only marginally interested by the Load Transient, so only three phases out of four contribute to the rise of the output voltage value Vout. This situation is valid in a general way: only n−1 phases respond to a current change associated with a Load Transient, with at least one phase remaining "lazy".

The second problem is instead associated with the repeatability of the parameter GBWP of the error amplifier EA of the controller 20. It is known that this parameter GBWP depends on a great number of technological parameters such as oxide thickness, lithographic tolerances, diffusivity of dopants, etc. Apart from the variance with the junction temperature, a departure of at least +/−50% from a nominal value of the parameter GBWP of an amplifier is a realistic situation.

Thus, considering an error amplifier EA with nominal value of the parameter GBWP of 30 MHz (which corresponds to a value of A0 equal to 100 dB and to a pole at 300 Hz), in practice the value of the parameter GBWP could vary between 15 MHz and 45 MHz.

By repeating the simulations on the known controller 20 with error amplifiers EA having the two extreme values indicated above for the parameter GBWP, the patterns shown in FIGS. 4A and 4B are obtained, which highlight the dependency of the change of the output voltage Vout on the real value of the parameter GBWP of the error amplifier EA.

It is thus occurs that, if for GBWP=45 MHz three phases out of four respond to the Load Transient, for GBWP=15 MHz only two phases out of four respond to the same Load Transient. Thus, the fall value of the output voltage Vout of the converter passes from 110 mV (with GBWP of 45 MHz) to 125 mV (with GBWP of 15 MHz).

Moreover, the known solution does not have any control during the la release step of the load and is not able to "follow" sudden decreases of the current requests under these release conditions with the production of undesired over-elongations of the output voltage value.

To try to solve this problem a "body-brake" technique has recently been proposed, as described for example in U.S. Pat. No. 6,806,689. A method for controlling a converter of the multiphase interleaving type which uses the body-brake technique provides that, under release conditions of the load, all the High Side and Low Side switches are off (while traditionally, that is in case of controllers which do not use this body-brake technique, the controller turns off the High Side switches but turns on the Low Side SWIs switches).

In this way, the over-elongation (or overshoot) of the output voltage Vout further to the release of the load is widely decreased with respect to controllers which do not use this body-brake technique. In fact, the excess of charge dQ generated by the zeroing of the currents of the inductors L of the phases of the multiphase interleaving converter is decreased due to the presence of Low Side switches off.

In particular, in the case of traditional controllers, this excess of charge is equal to the following.

$$dQ=L/V\text{out}*I\text{peak}$$

with Ipeak being a value of a residual current in the inductors L of the phases of the converter, the voltage fall to the ends of these inductors L being equal to the output voltage Vout.

To the contrary, by using the body-brake technique, the voltage fall to the ends of the inductors L is equal to Vout+ Vdiode, with Vdiode being the voltage value to the ends of the intrinsic diode of the Low Side switches under shut off conditions.

Thus, the fall to the ends of the inductors L is decreased due to the voltage fall on these intrinsic diodes and the excess of charge is given by the following.

$$dQ=U(V\text{out}+V\text{diode})*I\text{peak}.$$

Due to this decrease of the charge excess dQ, a decrease of the overshoot of the output voltage Vout is obtained.

The turn-on and turn-off conditions of the Low Side switches are shown in FIGS. 5A and 5B, and the corresponding patterns of the current values in the inductors of the phases and of the output voltage are shown qualitatively in FIGS. 5C and 5D.

In particular, it is known to detect the release conditions of the load by comparing a control voltage Vcntr (corresponding to an output voltage of the error amplifier EA, that is the voltage value COMP) with a reference voltage Vr as well as with a coupling voltage Vclamp of the body-brake.

Normally, the reference voltage Vr has a ramp-like or sawtooth periodic waveform, as shown in FIG. 5E. The turn-on (ON) and the turn-off (OFF) of the High Side and Low Side switches is then decided according to the following rules.

if Vctr>Vr, then High Side ON and Low Side OFF;

if Vctr<Vr and Vcntr>Vclamp, then High Side OFF and Low Side ON; and if Vctr<Vr and Vcntr<Vclamp, then High Side OFF and Low Side OFF, with this latter condition corresponding to the body-brake technique.

SUMMARY OF THE INVENTION

One embodiment of the present invention provides a method for controlling a converter of the multiphase interleaving type. According to the method, there is detected when a change of the load applied to an output terminal of the converter occurs. In response to detecting the change of the load applied to the output terminal of the converter, all of the phases of the converter are simultaneously turned on by generating suitable PWM driving signals. The PWM driving signals are controlled so as to force the turn-on of the phases at the same time and to zero a time phase shift of driving of the interleaving type of the PWM driving signals. Then, the time phase shift of driving of the interleaving type is recovered and a normal operation of the converter is restarted.

Another embodiment of the present invention provides controller for a converter of the multiphase interleaving type. The controller includes at least one error amplifier having a first input terminal coupled to a first inner terminal of the controller, a second input terminal receiving a reference voltage, and an output terminal coupled to a second inner terminal of the controller. The controller also includes multiple control modules coupled in parallel between first and second voltage references, with each of the control modules having an output terminal coupled to a phase of the converter, the first inner terminal being coupled to a terminal of the converter by a first resistor and the second inner terminal being feedback coupled to the first inner terminal by the series of a resistor and a capacitor and being suitable for supplying an inner signal. The controller also includes at least one detector of a change of a load applied to the terminal of the converter, first and second generator blocks for generating a pulse for the converter, and first and second output comparators. Each of these comparators includes an input terminal coupled to the detector and an output terminal coupled to one of the first and second generator blocks, the first generator block supplies the controller with a first pulse indicative of a positive load change and the second generator block supplies the controller with a second pulse indicative of a negative load change.

BRIEF DESCRIPTION OF THE DRAWINGS

FIGS. 5A-5D show equivalent circuits and the patterns of signals of a conventional converter of the multiphase interleaving type that uses the body-brake technique;

DETAILED DESCRIPTION

Figure 1A:
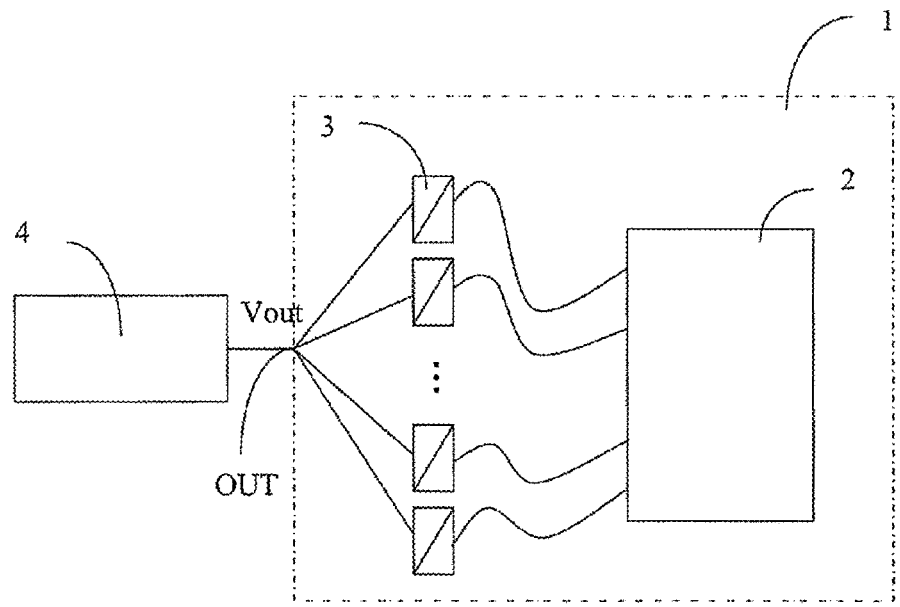
FIGS. 1A and 1B show a conventional converter of the multiphase interleaving type.
Figure 1B:
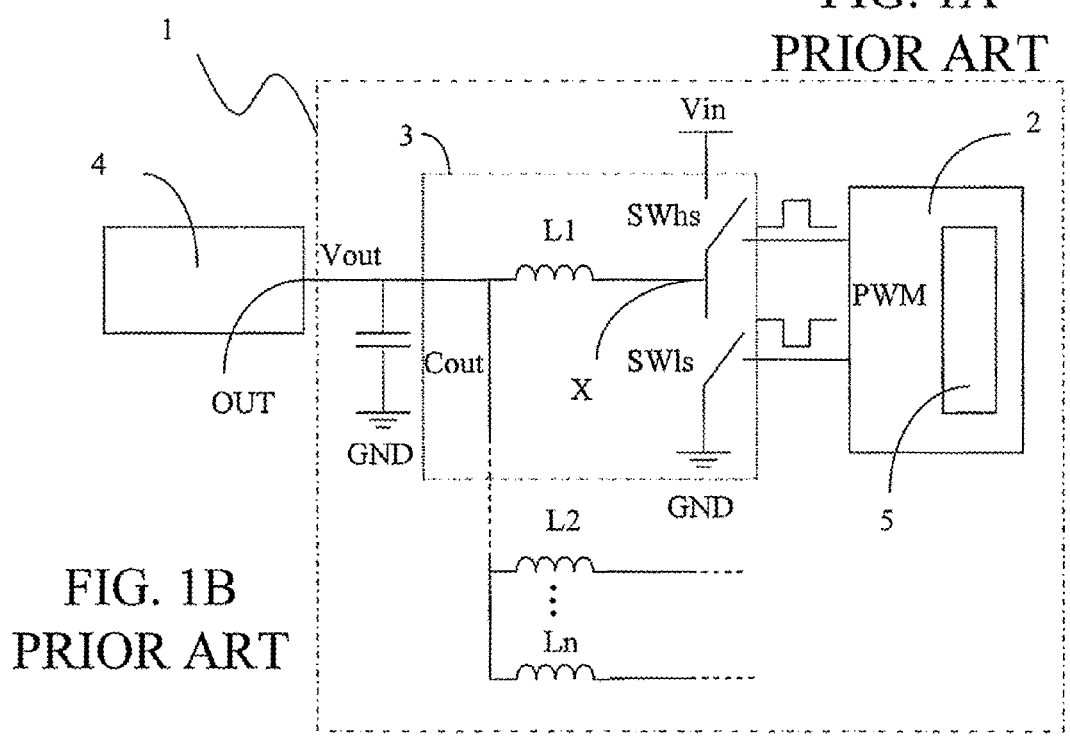

Embodiments of the present invention provide control methods and corresponding controllers for a converter of the multiphase interleaving type having such structural and functional characteristics as to ensure that the output voltage value also follows abrupt changes in load transients, thus overcoming the limits and the drawbacks still affecting the known converters. The phases of the multiphase interleaving converter are forced to all respond at the same time to a load transient, substantially interrupting and recovering the interleaving driving mechanism.

One embodiment of the present invention provides a method for controlling a converter of the multiphase interleaving type. According to the method, there is detected when a change of a load applied to an output terminal of the converter occurs, all of the phases of the converter are simultaneously turned on by generating suitable PWM driving signals, the PWM driving signals are driven so as to force the turn-on of the phases at the same time and to zero a time phase shift of driving of the interleaving type of the PWM driving signals, and the time phase shift of driving of the interleaving type is recovered and a normal operation of the converter is restarted.

In some embodiments of the present invention, the step of detecting the load change comprises detecting the derivative of a voltage signal on the output terminal.

In some embodiments of the present invention, the step of forcing the PWM driving signals comprises zeroing of the PWM driving signals of all the phases by generating a zeroing digital signal for each of the PWM driving signals.

Preferably, the generation of the zeroing digital signals comprises generating synchronous impulse signals so as to zero the PWM driving signals and to make them restart in an out of phase way according to the time phase shift of driving of the interleaving type.

In another embodiment of the present invention, the step of forcing the PWM driving signals comprises turn-off of the MOS power transistors which make the switches of the phases.

Preferably, the turn-off step comprises generating an interruption signal corresponding to a time range in which the switches must remain off.

Further, preferably the step of recovering the interleaving driving phase shift comprises ending turn-off step, in correspondence with the end of the generation of the interrupt signal, so that a recovery of the normal operation of the converter occurs in an automatic way once the interrupt signal is expired.

Another embodiment of the present invention provides a controller for a converter of the multiphase interleaving type. The controller includes at least one error amplifier having a first input terminal coupled to a first inner terminal of the controller, a second input terminal receiving a reference voltage, and an output terminal coupled to a second inner terminal of the controller. The controller also includes multiple control modules coupled in parallel with each other between first and second voltage reference and each having an output terminal coupled to a phase of the converter. The first inner terminal is coupled to a terminal of the converter by a first resistor and the second inner terminal is feedback coupled to the first inner terminal by the series of a resistor and a capacitor and is suitable for supplying an inner signal The controller further includes at least one detector of a change of a load applied to the terminal of the converter, and first and second output comparators each having at least an input terminal coupled to the detector and an output terminal coupled to first or second generator blocks of a pulse for the converter. The first generator block supplies the controller with a first pulse indicative of a positive load change (i.e., an application of the load), and the second generator block supplies the controller with a second pulse indicative of a negative load change (i.e., a release of the load).

In some embodiments of the present invention, the detector comprises a threshold derivator circuit sensitive to a derivative of a voltage signal on the terminal of the converter.

Preferably, the detector comprises at least an operational amplifier having a first input terminal coupled to a first input terminal of the detector, a second input terminal coupled to the second inner terminal of the controller, and an output terminal feedback coupled by a resistor to the input terminal of the detector.

In some embodiments, the controller further comprises a network comprising the series of a capacitor and a resistor coupled between the terminal of the converter and the first input terminal of the detector, which detects in this way the derivative of the voltage signal present on the terminal of the converter.

Preferably, the network is sized so as to meet the following relation.

$$\tfrac{1}{2}\pi Rd*Cd > j*Fsw$$

where Rd is a resistance value of the resistor of the network, Cd is a capacitance value of the capacitor of the network, and N*Fsw is a frequency value of the voltage signal on the terminal of the converter.

In one embodiment, the first and second output comparators have first input terminals coupled to the output terminal of the detector, second input terminals coupled to the input terminal of the detector by a first and a second generator, of an equal reference voltage, and output terminals respectively coupled to the first and second generator blocks.

In one embodiment of the present invention, the first and second generator blocks are generators of impulse signals on the rising edges suitable for positioning PWM driving signals of the phases below control voltage values.

Preferably, the first and second generator blocks comprise a flip-flip having an input terminal coupled to the supply voltage reference, a synchronization terminal receiving a synchronization signal, and an output terminal suitable for supplying an impulse signal; and a delay block coupled to a delay terminal of the flip-flip and supplying it with a delayed value of the synchronization signal that the delay block receives in turn at the input.

In some embodiments of the present invention, the controller further comprises a main oscillator for generating the PWM driving signals coupled to the first and second generator blocks and receiving from them the first and second pulses.

Preferably, the main oscillator comprises a first switch coupled between an inner circuit node and a first reference of minimum voltage of the oscillator and controlled by a first negated impulse signal; a second switch coupled to the inner circuit node as well as to a supply voltage reference by a generator of a oscillator current, with the second switch being driven by a first impulse signal; a capacitor of the oscillator coupled between the inner circuit node and a ground voltage reference; first and second operational amplifiers having first input terminals coupled to the inner circuit node, second input terminals coupled to a second reference of maximum voltage of the oscillator and the first reference of minimum voltage of the oscillator, and output terminals; and first and second logic gates having first input terminals coupled to the respective output terminals of the first and second operational amplifiers, second input terminals, and output terminals. The first logic gate has its output terminal coupled to the second input terminal of the second logic gate and to an output terminal of the main oscillator, the second logic gate has its output terminal coupled to the second input terminal of the first logic gate, and the main oscillator generates a first impulse signal on the output terminal and a triangular wave signal in correspondence with the inner circuit node.

In one embodiment, the controller further comprises a circuit for generating impulse signals that includes a first switch coupled between a first inner circuit node and the first reference of minimum voltage of the oscillator, with the first switch being driven by the first pulse generated by the detector; a generator of a current of the oscillator coupled between the supply voltage reference and the first inner circuit node as well as a capacitor of the oscillator coupled between the first inner circuit node and the first reference of minimum voltage of the oscillator; an input operational amplifier having a first input terminal coupled to the first inner circuit node, a second input terminal coupled to the second reference of maximum voltage of the oscillator, and an output terminal suitable for supplying a driving signal; a second switch coupled to the first inner circuit node and to a second inner circuit node and driven by the driving signal; a third switch coupled between the second reference of maximum voltage of the oscillator and the second inner circuit node and driven by a negated value of the driving signal, on the second inner circuit node a variable voltage value being present, as a function of the opening and closure of the second and third switches.

Preferably, the circuit for generating impulse signals further comprises a resistive divider comprising first, second, and third resistors in series between the second inner circuit node and the first reference of minimum voltage of the oscillator; first and second output operational amplifiers coupled to the resistive divider as well as to the main oscillator, and in particular to the inner circuit node; and first and second generators of impulse signals coupled to the first and second output operational amplifier and suitable for supplying a first and a second impulse signal.

Moreover, preferably the first output operational amplifier has a first input terminal coupled to a first interconnection circuit node of the second and third resistor of the resistive divider, a second input terminal coupled to the inner circuit node of the main oscillator and receiving it the triangular wave, and an output terminal suitable for supplying a first clock signal to the first generator of impulse signals; and the second output operational amplifier has a first input terminal coupled to a second interconnection circuit node of the first and second resistor of the resistive divider, a second input terminal coupled to the inner circuit node of the main oscillator and receiving it the triangular wave, and an output terminal suitable for supplying a second clock signal to the second generator of impulse signals.

In embodiment of the present invention, the first and second generators of impulse signals act on the falling edges of the first and second clock signals received by the first and second output operational amplifier.

Preferably, the first and second generators of impulse signals comprise a flip-flip having an input terminal coupled to the supply voltage reference, a synchronization terminal receiving a negated value of a synchronization signal and an output terminal suitable for supplying an impulse signal, and a delay block coupled to a delay terminal of the flip-flip and supplying it with a delayed value of the negated value of the synchronization signal that the delay block receives in turn at the input.

In one embodiment of the present invention, the controller further comprises a circuit for generating ramp signals to be used as PWM driving signals that includes a first switch coupled between a first inner circuit node and the second reference of maximum voltage of the oscillator and driven by the first pulse which indicates that an application of the load is in progress or by the impulse signal generated by the generator circuit of impulse signals; a generator of a current of the oscillator coupled between the supply voltage reference and the first inner circuit node; and a capacitor of the oscillator coupled between the first inner circuit node and the second reference of maximum voltage of the oscillator, with the circuit for generating ramp signals supplying on the first inner circuit node a ramp signal, which is zeroed (i.e., placed at a value equal to the first reference of minimum voltage of the oscillator) in the case wherein the first pulse has been received which indicates that an application is in progress of the load or the impulse signal generated by the generator circuit of impulse signals.

In one embodiment of the present invention, the controller further comprises circuit for generating a turn-off signal that includes a first switch coupled between a first inner circuit node and the second reference of maximum voltage value of oscillation and driven by the second pulse, which indicates that a release of the load is in progress; a generator of a current of the oscillator coupled between the first inner circuit node and the ground reference; a capacitor of the oscillator coupled between the first inner circuit node and the ground reference; and an operational amplifier having a first input terminal coupled to the second inner terminal of the controller, a second input terminal coupled to the first inner circuit node and an output terminal suitable for supplying a turn-off signal, with the circuit for generating a turn-off signal generating on the first inner circuit node a ramp signal which is carried from a value equal to the ground reference to a value equal to the reference of maximum voltage of oscillation at the receipt of the second pulse, the first inner circuit node discharging itself with a constant current equal to the current of the oscillator, and the operational amplifier comparing the ramp signal with the inner signal for producing the turn-off signal, which indicates for how long the phases of the converter have to be remain off.

The characteristics and the advantages of the control methods and controllers for a converter of the multiphase interleaving type according to the present invention will be apparent from the following description of exemplary embodiments thereof given by way of indicative and non-limiting examples with reference to the annexed drawings.

Embodiments of the present invention start from the consideration that the problems of response to quick load changes (or Load Transients) applied to a converter of the multiphase interleaving type are mainly linked to the interleaving driving mechanism which displaces the response of the single phases of the converter, with phase shift being an obstacle against a quick response of the converter itself. In particular, it has been considered how the ideal response to a Load Transient by the converter is that all of the phases respond at the same time and how exactly the interleaving phase shift adopted for the driving of the phases does not allow their simultaneous turn-on, and thus is responsible for at least one "lazy" phase.

Moreover, embodiments of the present invention take into due consideration the importance of minimizing the time range between the instant in which there is the Load Transient and the effective turn-on of all of the phases. This time range, in a conventional converter structure of the multiphase interleaving type as described above, with particular reference to the controller 20 of FIG. 2, widely depends on the speed at which the inner terminal COMP increases in voltage beyond a voltage level of the PWM driving signals of the phases. The speed of this inner terminal COMP depends on the parameter GBWP of the error amplifier EA.

According to embodiments of the present invention, a method is provided for controlling a converter of the multiphase interleaving type. According to the method, there is detected when a change load applied to an output terminal of the converter occurs (a Load Transient). All of the N phases of the converter are simultaneously turned on without modifying their gain, and the PWM driving signals are controlled so as to force the turn-on of the N phases of the converter at the same time and zero the interleaving driving time phase shift. The time phase shift of this driving of the interleaving type is recovered and a normal operation of the converter is restarted.

In this embodiment, the step of detecting the Load Transient comprises detecting the derivative of the voltage signal Vout at the output terminal of the converter.

In a preferred embodiment, the step of controlling the PWM driving signals comprises zeroing of the PWM driving signals of all of the phases by generating a zeroing digital signal for each one of these PWM driving signals. In particular, the zeroing digital signals are such synchronous impulse signals such to zero the PWM driving signals and to make them restart in a displacement mode according to the interleaving driving time phase shift.

Moreover, the step of controlling the PWM driving signals comprises a step of turn off the High Side and Low Side switches of the phases, in particular of the power transistors MOS which make these switches, for the release of a load coupled to the converter.

Further, this turn-off step comprises generating an interrupt signal HIZ corresponding to a time range in which the switches must be off.

The step of recovering the interleaving driving phase shift comprises ending the turn-off step, in correspondence with the end of the generation of the interrupt signal, the recovery of the normal operation of the converter occurring in an automatic way once the interrupt signal HIZ has expired.

Figure 6:
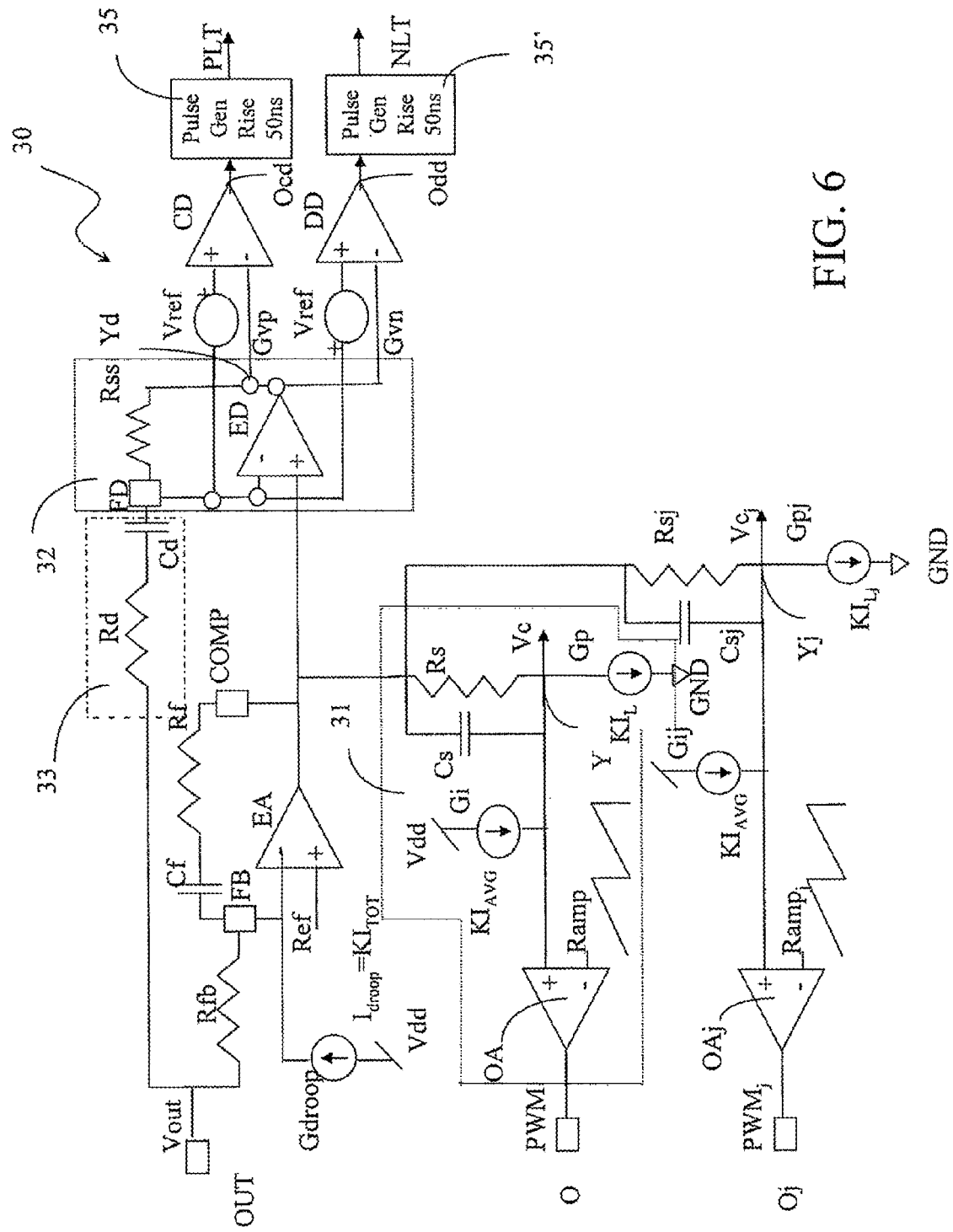
FIG. 6 shows a controller for a converter of the multiphase interleaving type according to one embodiment of the present invention.

A method for controlling a converter of the multiphase interleaving type according to one embodiment of the present invention is carried out by the controller shown in FIG. 6.

Figure 2:
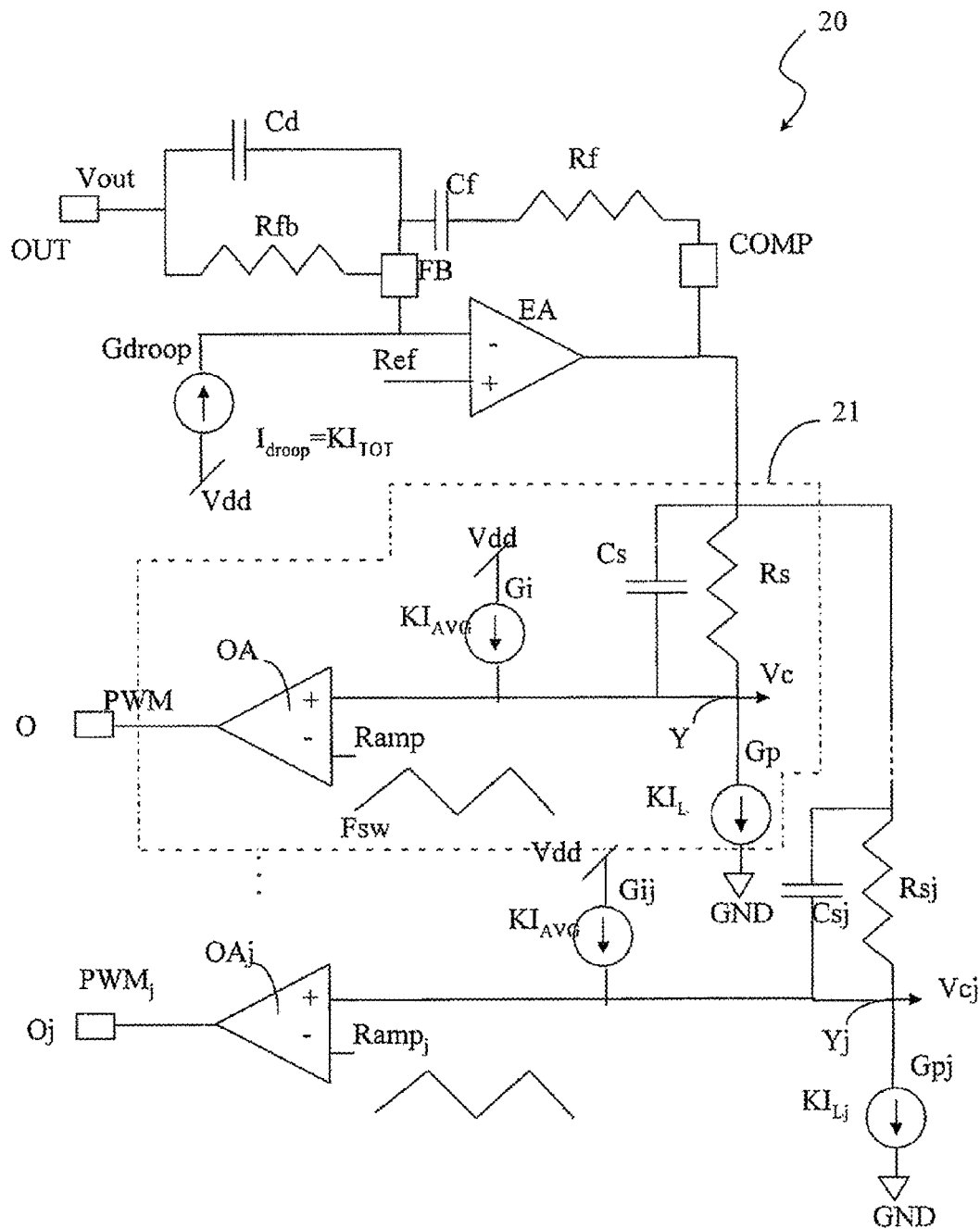
FIG. 2 shows a controller of the conventional converter of the multiphase interleaving type.
Figure 3:
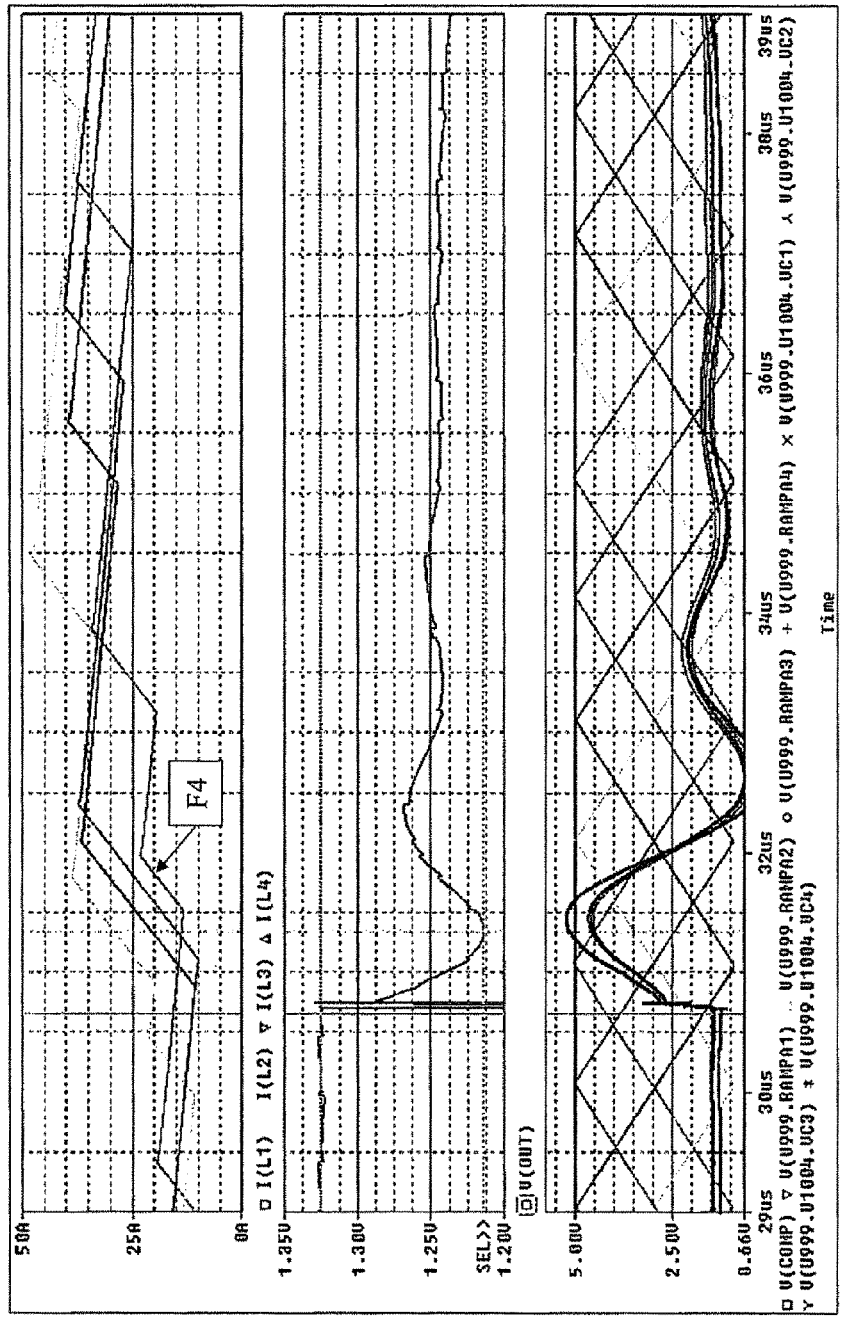
FIGS. 3, 4A, and 4B show the patterns of signals of the conventional converter of the multiphase interleaving type under different operating conditions.
Figure 4A:
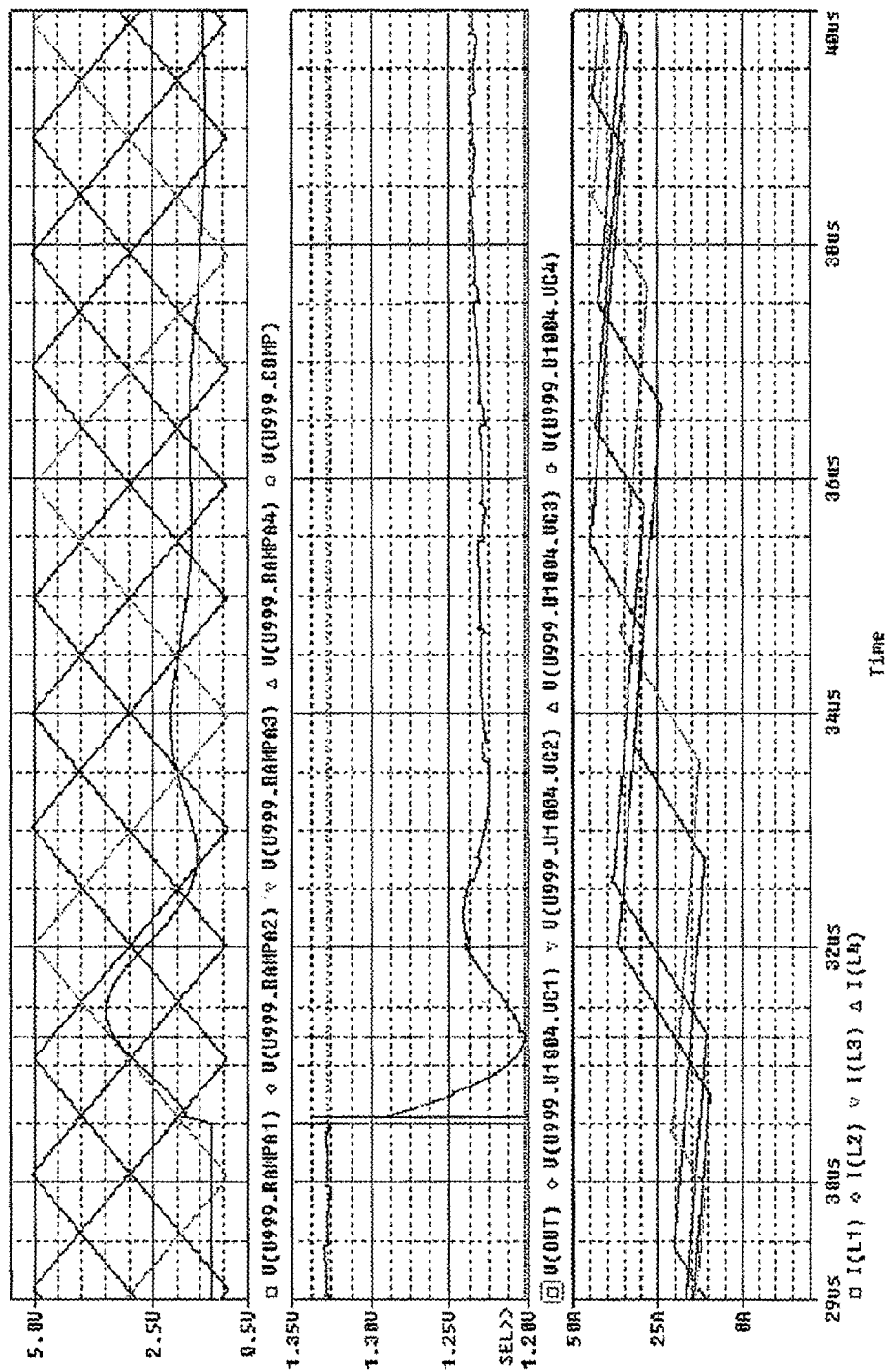
Figure 4B:
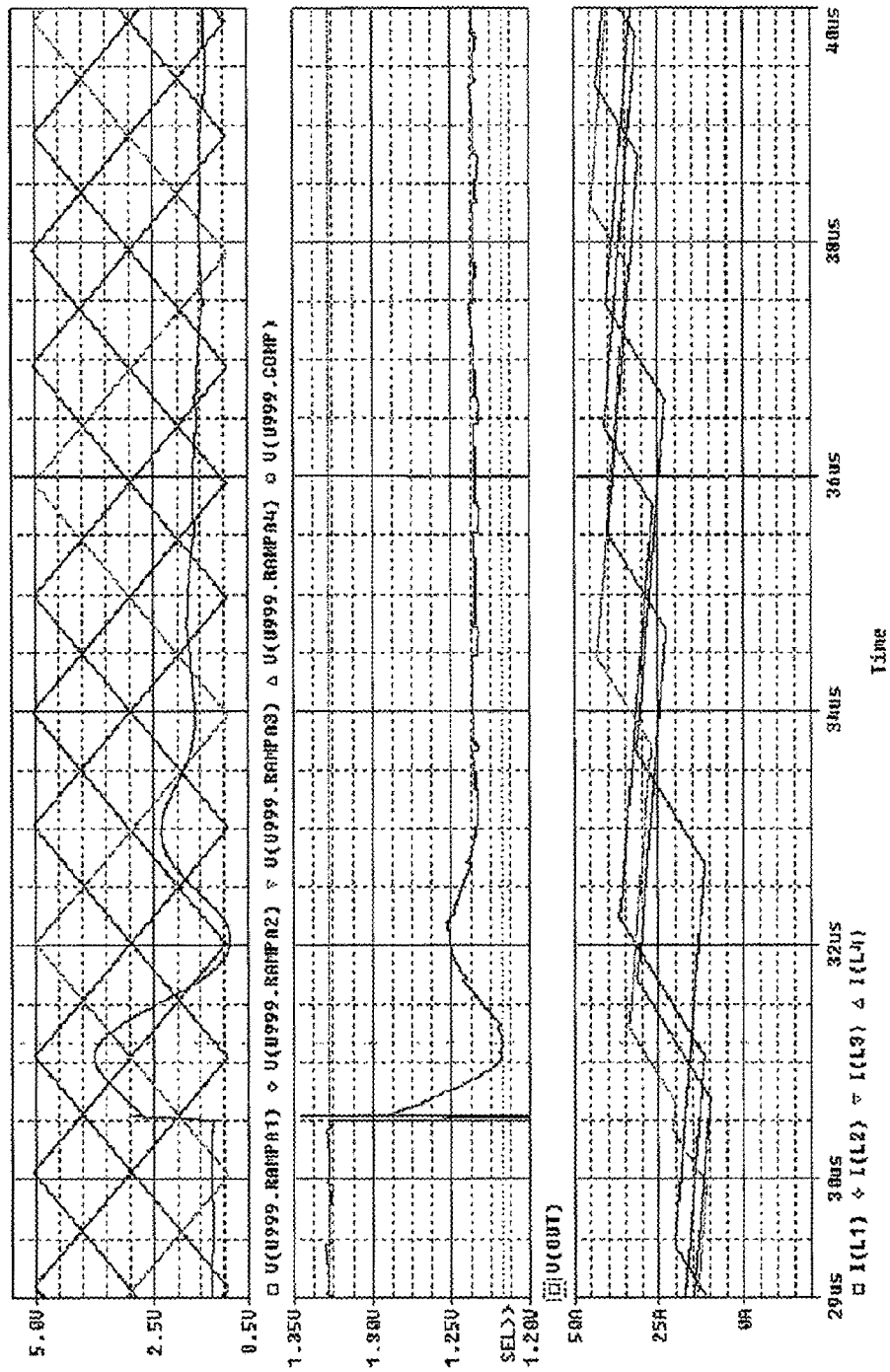

As shown, the controller 30 comprises a base structure similar to the conventional controller 20 described above. In this description, parts and elements having the same structure and operation as parts and similar elements of the device of FIG. 2 are given the same alphanumeric references.

The controller 30 has a terminal OUT, for its connection to a CPU, on which there is a voltage signal Vout. The terminal OUT is coupled to a first inner terminal FB by means of a resistor Rfb, with the first inner terminal FB being in turn coupled to a first inverting input terminal of an error amplifier EA and to a first current generator Gdroop, in turn coupled to a first voltage reference, in particular a supply voltage Vdd and suitable for supplying this first input terminal of the error amplifier EA with a current value Idroop equal to $K*I_{TOT}$, with K being a suitable scale factor and $I_{TOT}$ a total value of the current which flows in the inductors of the phases of the converter to which the controller 30 is coupled.

The error amplifier EA has a second non-inverting input terminal receiving a reference voltage Ref, and an output terminal coupled to a second inner terminal COMP of the controller 30, in turn feedback coupled to the first inner terminal FB by the series of a resistor Rf and a capacitor Cf.

The second inner terminal COMP is coupled to multiple control modules 31 that are connected in parallel to each other and each have an output terminal O coupled to a phase of the converter.

In particular, each control module 31 is coupled between first and second voltage references, in particular the supply voltage Vdd and a ground GND, and is coupled to the second inner terminal COMP.

A generic control module 31 comprises a resistor Rs and a capacitor Cs coupled in parallel between the second inner terminal COMP and an inner node Y of the module itself, in turn coupled to the ground GND by a biasing generator Gp, which supplies a current value equal to $K*I_L$, with K being the scale factor and $I_L$ a value of the current which flows in the inductor L of the phase coupled to the control module 31.

The control module 31 also comprises an input generator Gi coupled between the supply voltage reference Vdd and the inner node Y and suitable for supplying a current value equal to $K*I_{AVG}$, with K being the scale factor and $I_{AVG}$ a mean value of the currents which flow in the inductors L of the phases of the converter.

The inner node Y is also coupled to a first non-inverting input terminal of an operational amplifier OA of the control module 31, having in turn a second inverting input terminal receiving a ramp signal RAMP (having frequency Fsw), and an output terminal O coupled in turn to a corresponding phase of the converter and supplying it with a driving signal PWM.

In FIG. 6, the index j indicates the different phases of the converter coupled to the controller 30, which, as previously described, comprise a High Side switch SWhs coupled between an input voltage Vin and a switch node X, or phase node, and a Low Side switch SWls coupled between the phase node X and the ground GND, as well as an inductor L coupled between the phase node X and the terminal OUT of the converter to which the controller 30 is coupled, on this terminal OUT an output voltage value Vout, as well as a capacitor Cout coupled between the terminal OUT and the ground GND being present.

As previously explained, the PWM driving signals set the turn-on and turn-off times of the switches SWhs and SWls. In particular, when the driving signal PWM is at a high value, or "1", then the High Side switch SWhs is closed and the Low Side switch SWls is open. In a dual way, if the driving signal PWM is at a low value, or "0", then the High Side switch SWhs is open and the Low Side switch SWls is closed.

Also in this case, the current $I_L$ which flows in each inductor L of each phase of the converter is read by the controller 30 by the scale factor K.

In accordance with this embodiment of the present invention, the controller 30 also comprises a Load Transient detector 32 having an input terminal FD coupled, by a network 33 comprising the series of a capacitor Cd and a resistor Rd, to the terminal OUT of the converter of the multiphase interleaving type, for the connection for example to a CPU.

The Load Transient detector 32 comprises an operational amplifier ED having a first inverting input terminal coupled to the input terminal FD, and a second non-inverting input terminal coupled to the second inner terminal COMP of the controller 30, and an output terminal Yd feedback coupled by a resistor Rss to the input terminal FD.

In this way, the Load Transient detector 32 is essentially a threshold derivator circuit and the operational amplifier ED detects the derivative of the output voltage Vout present on the terminal OUT, due to the network 33 made of the resistor Rd and the capacitor Cd, suitably coupled between this terminal OUT and the input terminal FD of the Load Transient detector 32.

The controller 30 also comprises first and a second output comparators CD and DD having first inverting input terminals coupled to the output terminal Yd of the comparator ED of the Load Transient detector 32, and second non-inverting input terminals coupled to the input terminal FD of the Load Transient detector 32 respectively through first and second generators Gyp and Gvn of an equal reference voltage Vref, and first and second output terminals Ocd and Odd.

In accordance with this embodiment of the present invention, the controller 30 also comprises first and second circuit block 35 and 35' respectively coupled to the output terminals Ocd and Odd of the first and of the second output comparators CD and DD.

In particular, the first circuit block 35 creates a pulse, in particular small and equal for example to 50 ns, indicated with PLT (Positive Load Transient), which is transmitted to the controller and is suitable for signaling that a positive Load Transient is in progress (i.e., a load application). Similarly, the second circuit block 35' creates a pulse, in particular small and equal to for example to 50 ns, indicated with NLT (Negative Load Transient), which is transmitted to the controller and is suitable for signaling that a negative Load Transient is in progress (i.e., a release of the load).

As already seen above with respect to the conventional device, so as not to derive also the residual ripple of the signal Vout (which is a frequency signal equal to N*Fsw), the network 33 is sized so as to meet the following relation.

$$1/2\pi Rd*Cd > j*Fsw$$

where Rd is the resistance value of the resistor Rd; Cd is the capacitance value of the capacitor Cd, and N*Fsw is the frequency of the signal Vout.

The ripple of the output voltage signal Vout is about 10 mV peak-peak, while the voltage fall DVout further to a Load Transient is about 100 mV. Moreover, when there is a Load Transient, it is so quick as to consider the impedance associated with the capacitor Cd of the network 33 approximately void. Then, considering that the value Id of the current which crosses the resistor Rd is equal to Id=DVout/Rd, it is possible to size the resistor Rd so that the following relation occurs.

$$DVout/Rd \times Rdd > Vref$$

with Rdd being the resistance value of the feedback resistor, and Vref being the "neat" voltage value of the output comparators CD and DD.

The resistance value of the resistor Rd must thus meets the following relation.

$$Rd < DVout \times Rdd/Vref$$

The Load Transient detector 32 is sensitive to the negative and positive derivatives of the output voltage Vout. In particular, when the first output comparator CD starts further to the detection of the negative derivative, the first circuit block 35 creates a pulse PLT for indicating that a positive Load Transient (application of the load) is in progress, while, when the comparator DD starts further to the detection of the positive derivative, the second circuit block 35' creates a pulse NLT for indicating that a negative Load Transient (release of the load) is in progress. The first and the second circuit blocks 35 and 35' are generators of impulse signals on the rising edges.

For a correct operation of the controller 30, once a pulse PLT is received, the PWM driving signals are positioned below the control voltage values, that is, signals comprising the information of unbalance of the currents IL of the phases and also that of voltage regulation and compares them with ramp signals for generating the PWM driving signals.

In particular, once a pulse PLT is received, the PWM driving signals are immediately zeroed. These ramp signals are normally constructed with an interleaving phase shift that is equal to j/Fsw and are obtained starting from a main oscillator suitable for supplying a first impulse signal and from a circuit for generating impulse signals, suitable for supplying the remaining impulse control signals for the zeroing of the PWM driving signals.

Figure 7:
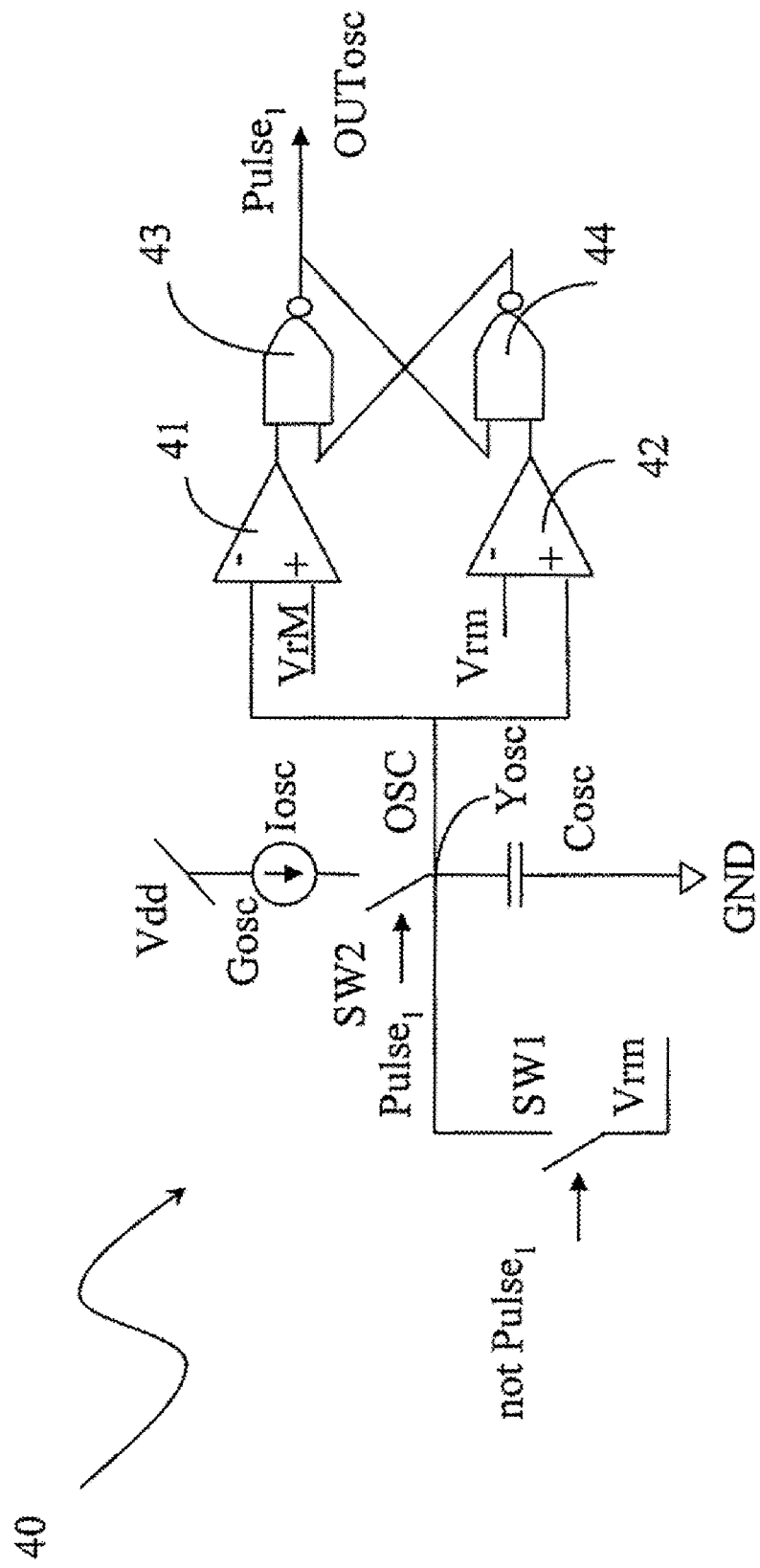
FIG. 7 shows a main oscillator for the controller according to one embodiment of the present invention.

One exemplary circuit implementation of a main oscillator is shown in FIG. 7. The main oscillator 40 comprises a first switch SW1 coupled between an inner circuit node Yosc and a first voltage reference, in particular a minimum voltage Vrm of the oscillator and controlled by a first negated impulse signal Pulse1.

The main oscillator 40 also comprises a second switch SW2 coupled to the inner circuit node Yosc as well as to a supply voltage reference Vdd by a generator Gosc of an oscillator current Iosc, the second switch SW2 being driven by a first impulse signal, Pulse1, having negated value with respect to the first negated impulse signal /Pulse1.

The inner circuit node Yosc is also coupled to the ground GND by a capacitor of the oscillator Cosc.

Further, the main oscillator 40 comprises first and second operational amplifiers 41 and 42 having first inverting input terminals coupled to the inner circuit node Yosc, second non-inverting input terminals coupled to a second voltage reference, in particular a maximum voltage VrM of the oscillator and to the minimum voltage Vrm of the oscillator, as well as output terminals coupled to first input terminals of respective first and second logic gates 43 and 44.

The first logic gate 43 has an output terminal coupled to an output terminal OUTosc of the main oscillator 40, whereon the first impulse signal Pulse1 is supplied and to a second input terminal of the second logic gate 44. Similarly, the second logic gate 44 has an output terminal coupled to a second input terminal of the first logic gate 43.

The main oscillator 40 generates the first impulse signal Pulse1 on its output terminal OUTosc, as well as a triangular wave signal OSC in correspondence with its inner circuit node Yosc.

Figure 8:
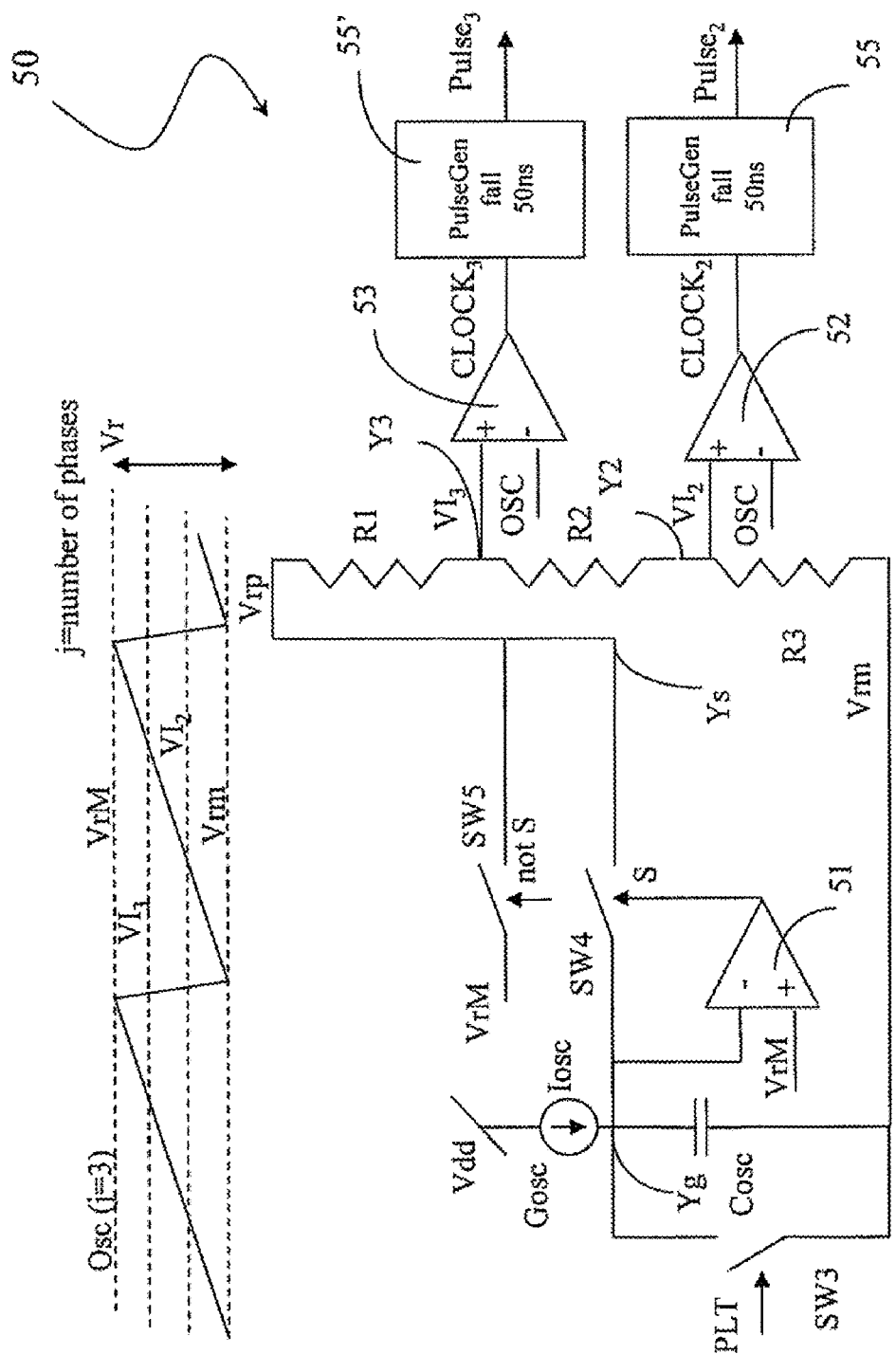
FIG. 8 shows a circuit for generating impulse signals for the controller according to one embodiment of the present invention.

The controller 30 further comprises a circuit for generating impulse signals. One embodiment of such a circuit is shown in FIG. 8.

As shown, the circuit for generating impulse signals 50 comprises a first switch SW3 coupled between a first inner circuit node Yg and a first voltage reference, in particular the minimum voltage Vrm of the oscillator, the first switch SW3 being driven by the pulse PLT which indicates that a positive Load Transient (application of the load) is in progress. The circuit for generating impulse signals 50 further comprises a generator Gosc of a current Iosc of the oscillator, coupled between a supply voltage reference Vdd and the first inner circuit node Yg and a capacitor Cosc of the oscillator coupled between the first inner circuit node Yg and the first reference of minimum voltage Vrm of the oscillator.

Further, the circuit for generating impulse signals 50 comprises an input operational amplifier 51 having a first inverting input terminal coupled to the first inner circuit node Yg, a second non-inverting input terminal coupled to a second voltage reference, in particular a maximum voltage VrM of the oscillator, and an output terminal suitable for supplying with a driving signal S a second switch SW4, in turn coupled to the first inner circuit node Yg and to a second inner circuit node Ys.

A third switch SW5 is coupled between the second reference of maximum voltage VrM of the oscillator and the second inner circuit node Ys and driven by a negated value/S of the driving signal S. In this way, on the second inner circuit node Ys there is a variable voltage value, indicated with Vrp, as a function of the opening and closure of the second and third switches SW4 and SW5.

A resistive divider comprising a first resistor R1, a second resistor R2, and a third resistor R3, in series, is coupled between the second inner circuit node Ys and the first minimum voltage reference Vrm of the oscillator.

The circuit for generating impulse signals 50 comprises first and second output operational amplifier 52 and 53. In particular, the first output operational amplifier 52 has a non-inverting first input terminal coupled to a first interconnection circuit node Y2 between the second and third resistors R2 and R3, a second inverting input terminal receiving the triangular wave OSC supplied by the main oscillator 40 in correspondence with its inner circuit node Yosc and reported for convenience also in FIG. 8, in the case of j=3, and an output terminal suitable for supplying a first clock signal $CLOCK_2$.

Further, the second output operational amplifier 53 has a first non-inverting input terminal coupled to a second interconnection circuit node Y3 between the first and second resistors R1 and R2, a second inverting input terminal receiving the triangular wave OSC, as well as an output terminal suitable for supplying a second clock signal $CLOCK_3$.

The first and second output operational amplifiers 52 and 53 are coupled at the outputs to respective generators of impulse signals 55 and 55' suitable for supplying first and second impulse signals $Pulse_2$ and $Pulse_3$. The generators of impulse signals 55 and 55' act on the falling edges of the clock signals $CLOCK_2$ and $CLOCK_3$ received at the input.

Figure 9A:
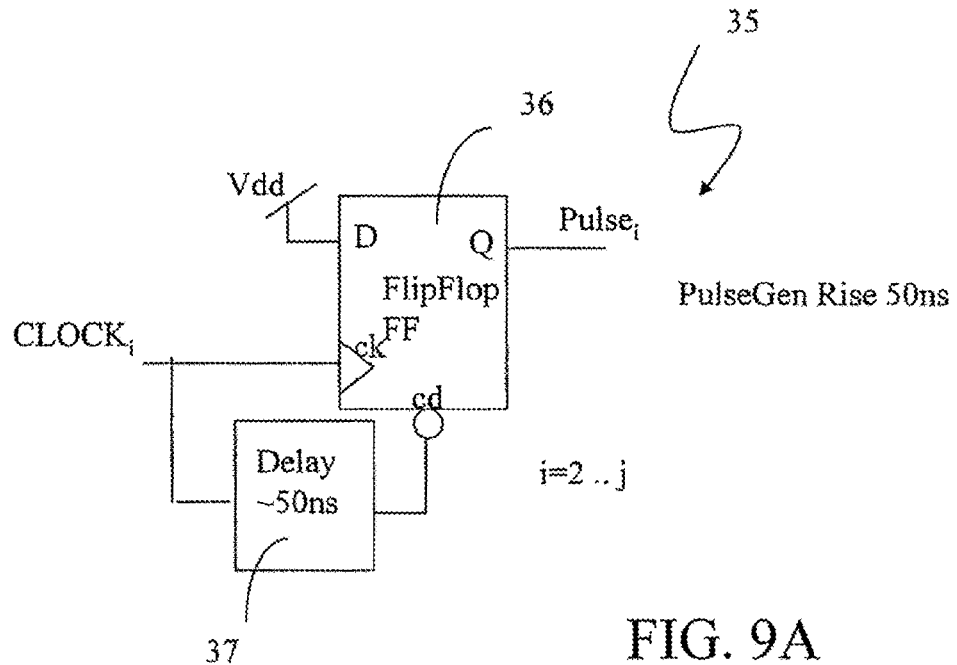
FIGS. 9A and 9B show generators of impulse signals for the controller according to one embodiment of the present invention.

In particular, the implementation of a generator of impulse signals on the rising edges, such as the first and second circuit blocks 35 and 35', according to one embodiment of the present invention is shown in FIG. 9A.

The generator PulseGen Rise 35 comprises a flip-flip 36 having an input terminal D coupled to a supply voltage reference Vdd, a synchronization terminal ck receiving a synchronization signal CLOCKi, and an output terminal Q suitable for supplying an impulse signal Pulsei. The flip flop 36 also comprises a delay terminal cd receiving, through a delay block 37, a delayed value of the synchronization signal CLOCKi that the delay block 37 receives in turn at the input.

Figure 9B:
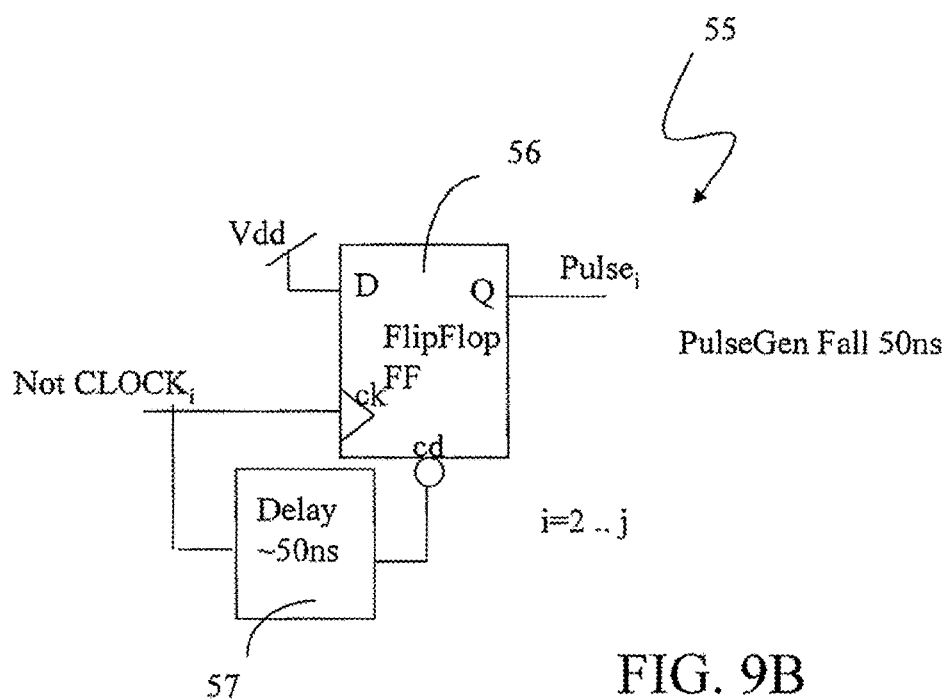

Similarly, the implementation of a generator of impulse signals on the falling edges, such as the generators 55 and 55', according to one embodiment of the present invention is shown in FIG. 9B.

The generator PulseGen Fall 55 comprises a flip-flip 56 having an input terminal D coupled to a supply voltage reference Vdd, a synchronization terminal ck receiving a negated value/CLOCKi of the synchronization signal CLOCKi, and an output terminal Q suitable for supplying an impulse signal Pulsei. The flip flop 56 also comprises a delay terminal cd receiving, through a delay block 57, a delayed value of the synchronization negated signal /CLOCKi that the delay block 57 receives in turn at the input.

Figure 10:
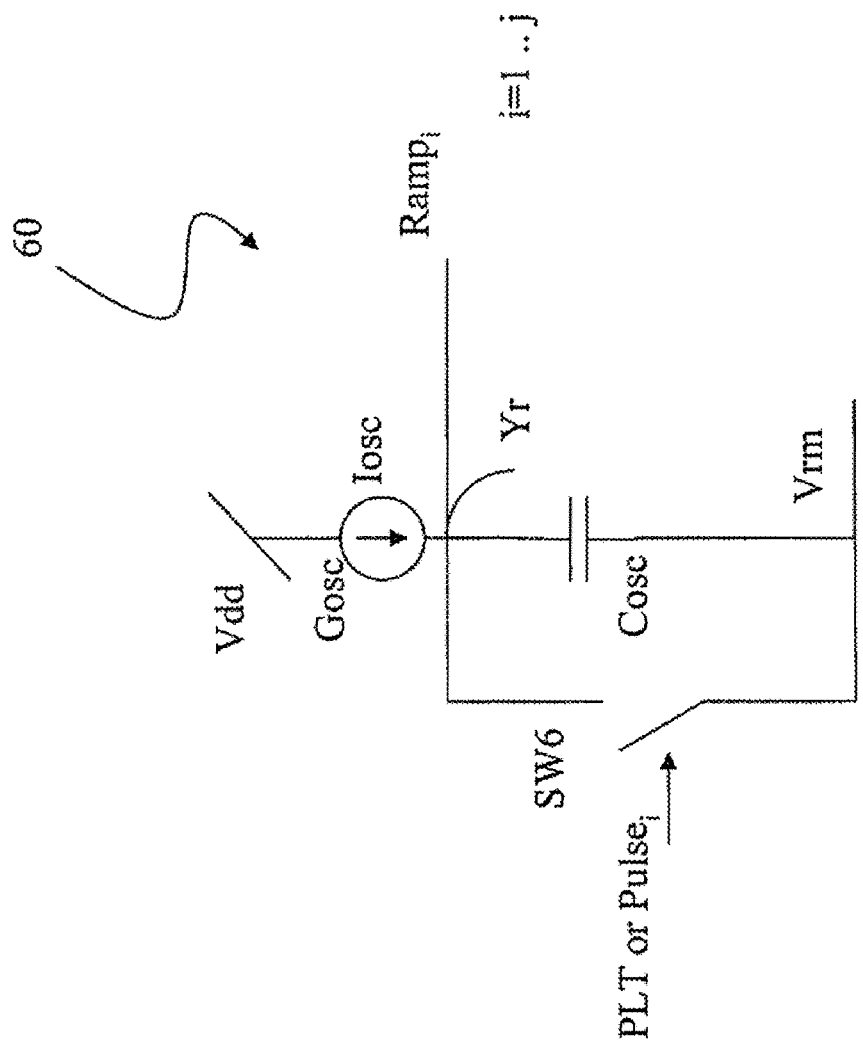
FIG. 10 shows a circuit for generating ramp signals for a controller according to one embodiment of the present invention.

The controller 30 also comprises a circuit for generating ramp signals Rampi to be used as PWM driving signals. One embodiment of such a circuit is shown in FIG. 10.

The circuit for generating ramp signals 60 comprises a first switch SW6 coupled between a first inner circuit node Yr and a first voltage reference, in particular the maximum voltage VrM of the oscillator. The first switch SW6 is driven by the pulse PLT which indicates that a positive Load Transient (application of the load) is in progress or by an impulse signal Pulsei generated by the circuit for generating impulse signals 50. The circuit for generating ramp signals 60 also comprises a generator Gosc of a current Iosc of the oscillator, coupled between a supply voltage reference Vdd and the first inner circuit node Yr as well as a capacitor Cosc of the oscillator coupled between a first inner circuit node Yr and the first reference of maximum voltage VrM of the oscillator.

In this way, the circuit for generating ramp signals 60 supplies on the first inner circuit node Yr a ramp signal Rampi, which is zeroed, (i.e., placed at a value equal to the minimum voltage Vrm of the oscillator) if either an impulse signal has been received Pulsei or a positive load transient has come up, as signaled by the pulse PLT.

In particular, the circuit for generating ramp signals 60, when a pulse PLT comes zeroes the ramps Rampi (i.e., the PWM driving signals), in this way forcing the simultaneous turn-on of the High Side switches of the phases of the converter the controller 30 is coupled to, zeroing in particular the interleaving phase shifts of these PWM driving signals. Naturally, the High Side switches turn on in case there are control voltages higher than the reset value of the respective ramp signals Rampi.

Figure 11:
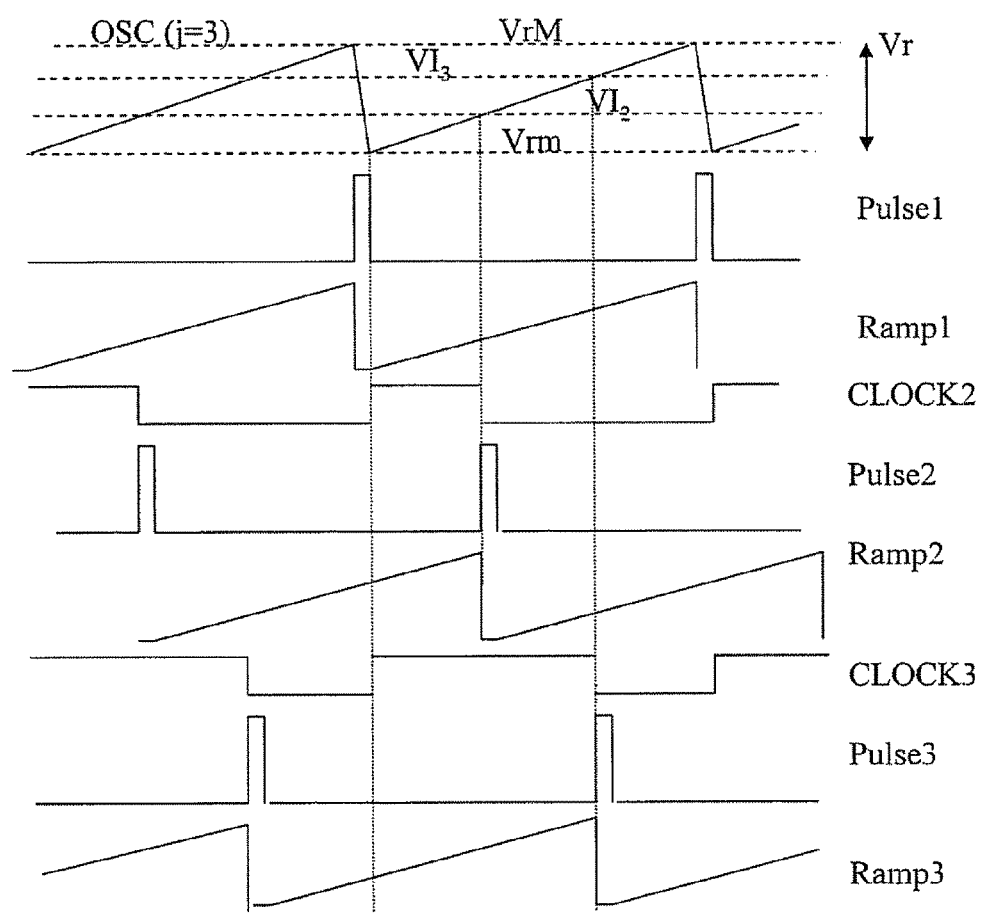
FIG. 11 shows signals for the circuit of FIG. 10.

In substance, the main oscillator 40 supplies a triangular wave OSC of height equal to Vr and with values comprised between a minimum value Vrm (for example, 0.5V) and a maximum value VrM (for example, 2.5V), as shown for example in FIG. 11 for j=3.

The repetition period of the triangular wave OSC depends on the set switching frequency Fsw.

In particular, the discharge step must be much quicker than the charging step and its duration must be made negligible with respect to the interleaving phase shift. For example, if the maximum value of the frequency Fsw is 500 KHz (period 2us) and j=4, the discharge step of the triangular wave OSC must be lower than 500 ns (e.g., about 50 ns).

The voltage Vr of the triangular wave OSC, comprised between Vrm and VrM, is divided into j−1 equal parts; thus voltages Vl are created equal to the following.

$$VI_{i+1} = \Sigma_{i=1 \ldots j}(Vr/j)$$

The discharge step of the triangular wave OSC detects a first digital signal Pulse1 which is advantageously used for zeroing, in particular bringing to a value equal to Vrm, a first driving signal PWM, indicated as Ramp1 in FIG. 11.

Further, by intercepting the value of the voltages VIi and of the triangular wave OSC clock digital signals are produced, indicated as CLOCKi, whose falling edges are used by the generator PulseGen Fall 55 and 55' sensitive to the falling edge, for producing respective digital pulses Pulsei. The duration of the pulses is set small, for example equal to about 50 ns.

Advantageously, the digital pulses Pulsei zero a corresponding driving signal PWM, indicated as Rampi. The synchronism of the digital pulses Pulsei is such as to create PWM driving signals out of phase with respect to each other according to the interleaving (j/Fsw).

In particular, FIG. 11 indicates the digital pulses Pulse1, Pulse2, and Pulse3, the corresponding PWM driving signals Ramp1, Ramp2, and Ramp3, and the synchronization signals $CLOCK_2$ and $CLOCK_3$ supplied by the operational amplifiers 53 and 54 of the circuit for generating impulse signals 50.

Figure 12:
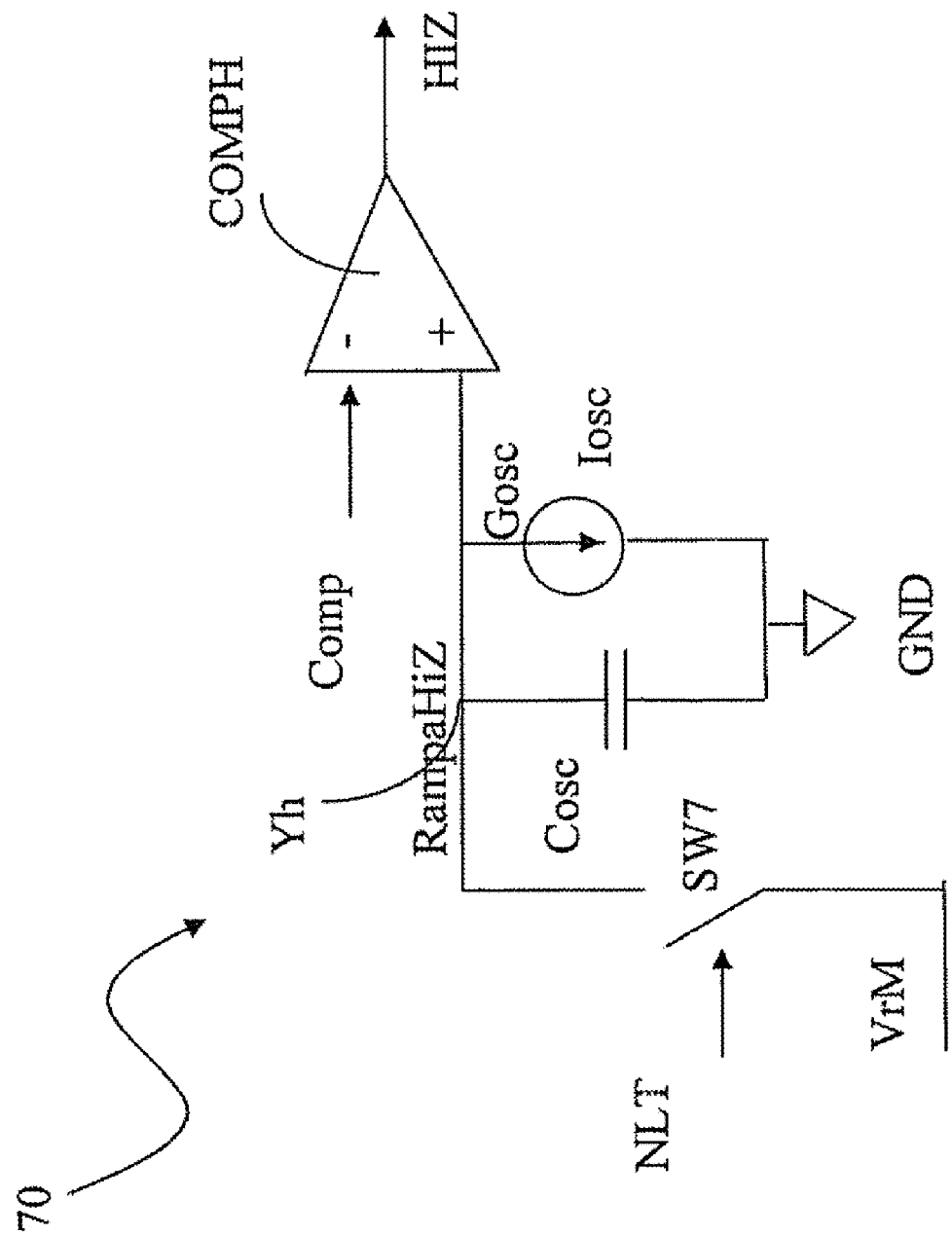
FIG. 12 shows a circuit for generating a turn-off signal for the controller according to one embodiment of the present invention.

Further, the controller 30 comprises a circuit for generating a turn-off signal of the transistors of the phases. One embodiment of such a circuit is shown in FIG. 12.

The circuit for generating a turn-off signal 70 comprises a first switch SW7 coupled between a first inner circuit node Yh and a first voltage reference, in particular a maximum voltage VrM of oscillation. The first switch SW 7 is driven by the pulse NLT, which indicates that a negative Load Transient (release of the load) is in progress, and generates on its first inner circuit node Yn a ramp signal RampaHiZ. The circuit for generating a turn-off signal 70 also comprises a generator Gosc of a current Iosc of the oscillator, coupled between the first inner circuit node Yh and a ground reference GND as well as a capacitor Cosc of the oscillator coupled between the first inner circuit node Yh and the ground GND.

The circuit for generating a turn-off signal 70 further comprises an operational amplifier COMPH having a first inverting input terminal d receiving a signal Comp present on the inner terminal COMP, a second non-inverting input terminal coupled to the first inner circuit node Yh, and an output terminal suitable for supplying a turn-off signal HIZ.

In this way, at the receipt of the pulse NLT, the ramp RampaHiZ on the first inner circuit node Yh is brought to a value 0V equal to a value equal to the maximum voltage VrM of oscillation. This first inner circuit node Yh is then discharged by a constant current equal to the current Iosc of the oscillator.

The operational amplifier COMPH compares the ramp RampaHiZ with the signal Comp producing at the output the turn-off signal HIZ, which indicates how long the transistors of the phases must remain off.

In substance, the circuit for generating a turn-off signal 70 forces the turn-off of the transistors of the phases due to the turn-off signal HIZ, which determines also the turn-off duration.

At this point, the controller 30 provides the recovery of the interleaving phase shift for the driving of the phases of the converter in normal operation.

Figure 13A:
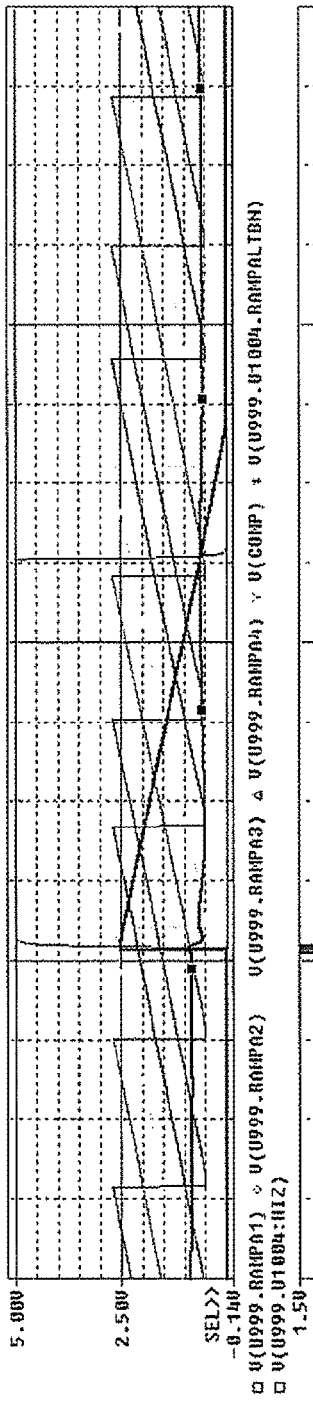
FIGS. 13A-13C and 14 show signals of the converter of the multiphase interleaving type according to one embodiment of the present invention under different operating conditions.
Figure 13B:
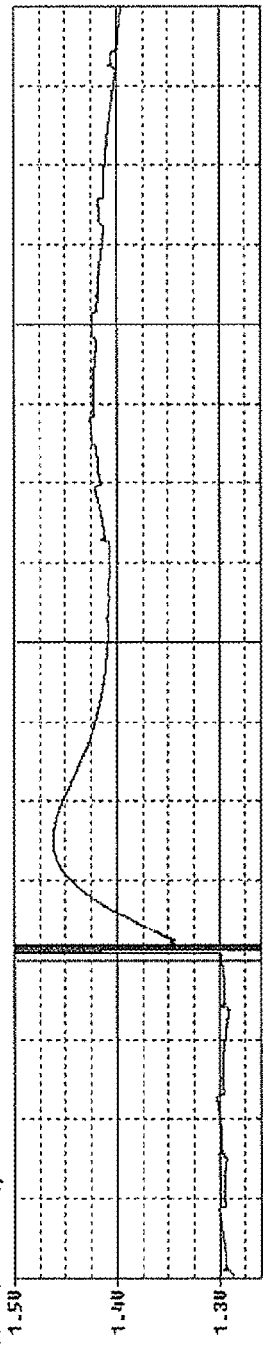
Figure 13C:
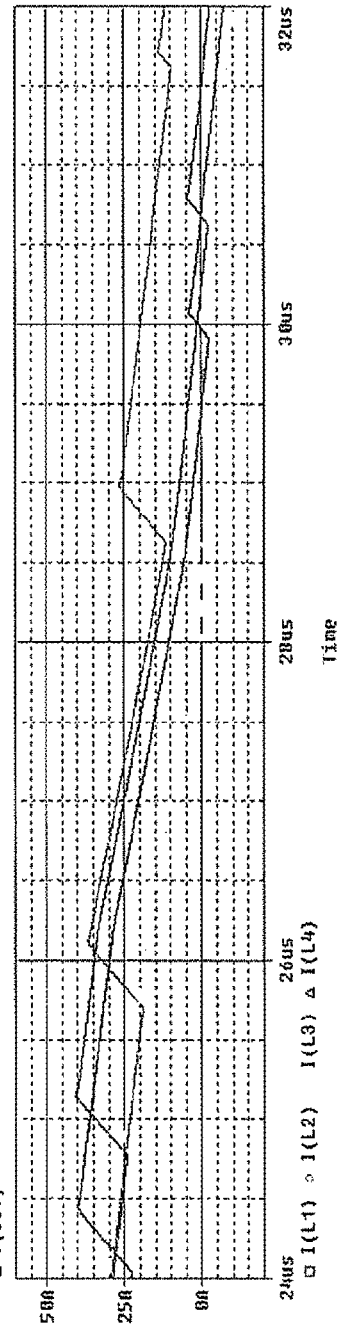

Advantageously, by using the controller 30 according to an embodiment of the present invention, the recovery of the interleaving phase shift is automatic since it has never been interrupted. In particular, when the turn-off signal HIZ has expired, the normal steps of the converter restart following the interleaving phase shift of the PWM driving signals, as shown in FIGS. 13A-13C. These figures show the results of simulations carried out on a converter of the multiphase interleaving type with four phases.

The response of all of the phases having been synchronized with the Load Transient, advantageously in accordance with the present invention, the controller 30 according to the present invention minimizes the reaction time between the instant when a Load Transient occurs and that when effectively the currents of the inductances increase until they reach a steady value requested by the load. In particular, the reaction time of the controller 30 thus no longer depends on the value of the parameter GBWP (Gain Bandwidth Product) of the error amplifier EA of the controller 30 (i.e., on the speed with which the inner terminal COMP moves), but only on the delay of the output comparator CD.

Figure 14:
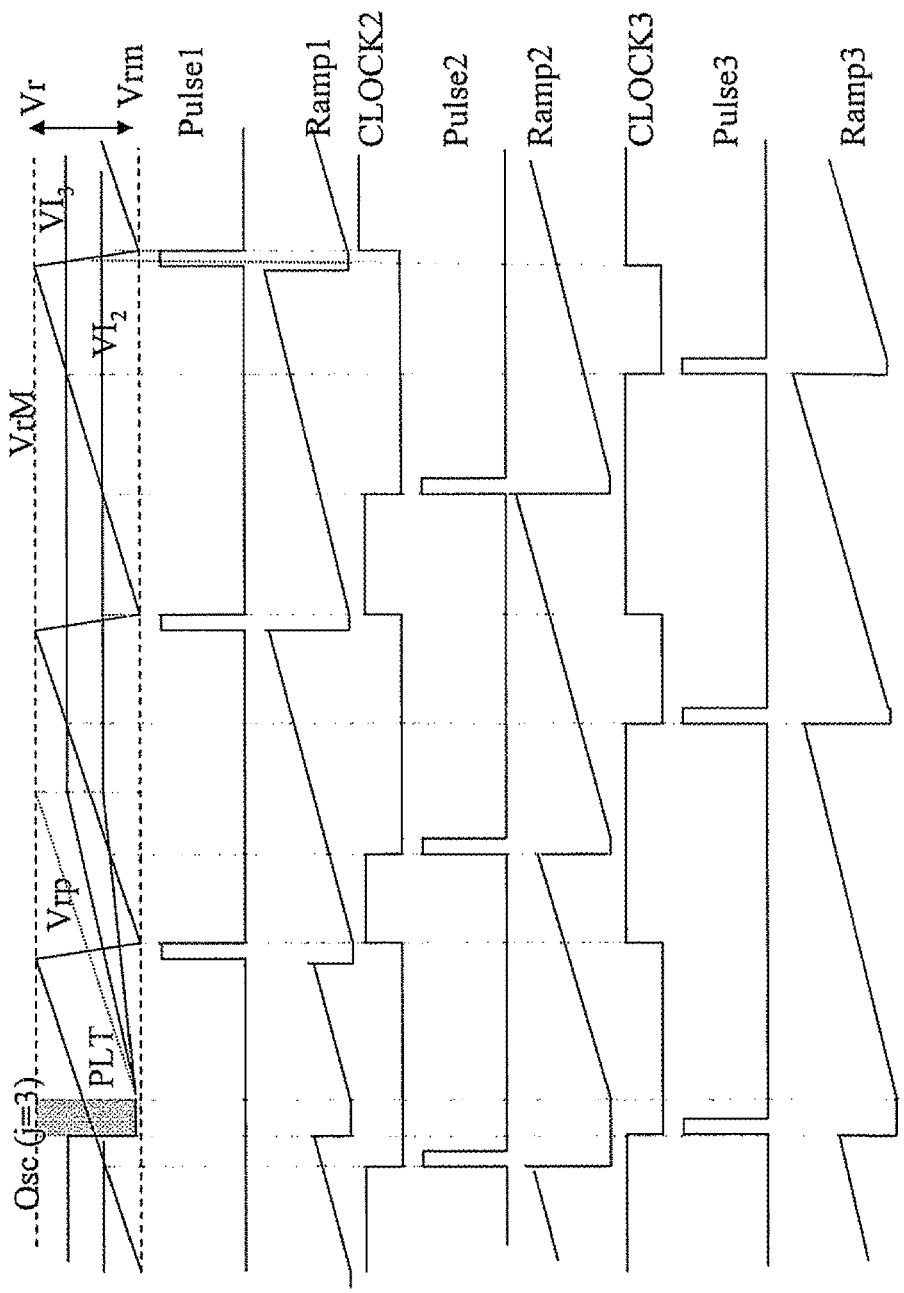

This automatic recovery mechanism is shown in FIG. 14, where it is clear how the PWM driving signals update the interleaving phase shift, once the response of the Load Transient has ended.

In fact, the operation that senses the derivative always maintains its regulation and the only specification that it must respect is that of having enough speed, that is such a parameter GBWP as not to detect (operating correctly) the ripple of the output voltage Vout. In particular, the ripple being the output voltage Vout at the maximum equal to j×Fsw (<2 MHz), the value requested for the parameter GBWP is limited to only 20 MHz.

In particular, the recovery of the interleaving (i.e., the attainment of a voltage value equal to Vrp by the single phases) must occur within the first switching period (1/Fsw) since the Load Transient has occurred. In this way, each step geometrically responds with a duty cycle directly controlled by the operational amplifier EA.

If it were not like this, the recovery of the interleaving would modify the duty cycle of each step creating an undesired and unsuitable error of "current sharing" between the phases.

Advantageously, the recovery of the interleaving occurs maintaining for each ramp of the PWM driving signals a same inclination. This allows there to be a correct modulation of these PWM driving signals.

With reference to the controller 30 of FIG. 6, the current signals KIL are made from a reading on the voltage fall VIs of the MOS transistors of the Low Side switches SWIs. These voltage signals VIs are detected during the turn-on of the transistors and are equal to: −Rds×IL. The same are then converted into the currents KIL through an external resistance.

The current signal KIL is thus not always available; it is available only when the Low Side switches SWIs are on. This current signal KIL is then sampled obtaining a sampling digital signal, in particular constructed by intercepting the signals PWMi with a set voltage called VTHSAMPLE. The signals PWMi nominally have their peak equal to the maximum voltage VrM of the oscillator. For example, if VrM=2.5V, this set voltage value VTHSAMPLE can be 2.4V.

When there is a Load Transient, the recovery of the interleaving lowers the voltage peak of PWMi not allowing the interception of PWMi with the value VTHSAMPLE.

During the period 1/Fsw after the Load Transient (step of recovery of the interleaving), there is no sampling and thus there is no control of current sharing since the current signals KILi and KIAVG have not been updated.

This makes even better the response to the Load Transient which remains only in power of the signal COMP and of the PWM driving signals PWMi.

Moreover, advantageously the recovery of the interleaving driving is automatic, once the turn-off signal has expired.

The present invention is particularly, but not exclusively, suited to a method for controlling a converter of the multiphase interleaving type in the presence of sudden changes of an associated load, and the above description is made with reference to this field of application to simplify its illustration.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, one embodiment of the present invention may not include all of the features described above. Therefore, it is intended that the present invention not be limited to the particular embodiments disclosed, but that the invention include all embodiments falling within the scope of the appended claims.

What is claimed is:

1. A method for controlling a converter of the multiphase interleaving type, the comprising the steps of:

detecting when a change of the load applied to an output terminal of the converter occurs;

in response to detecting the change of the load applied to the output terminal of the converter, simultaneously turning on all of the phases of the converter by generating suitable PWM driving signals;

controlling the PWM driving signals so as to force the turn-on of the phases at the same time and to zero a time phase shift of driving of the interleaving type of the PWM driving signals; and after the controlling step, recovering the time phase shift of driving of the interleaving type and restarting a normal operation of the converter.

2. The method according to claim 1, wherein the detecting step comprises detecting the derivative of a voltage signal on the output terminal.

3. The method according to claim 2, wherein the controlling step comprises zeroing of the PWM driving signals of all of the phases by generating a zeroing digital signal for each of the PWM driving signals.

4. The method according to claim 3, wherein the generation of the zeroing digital signals comprises generating synchronous impulse signals so as to zero the PWM driving signals and to make them restart in an out of phase manner according to the time phase shift of the driving of the interleaving type.

5. The method according to claim 2, wherein the controlling step comprises turning-off of MOS power transistors of the switches of the phases.

6. The method according to claim 5, wherein the turning-off of the MOS power transistors comprises generating an interrupt signal corresponding to a time range in which the switches must remain off.

7. The method according to claim 6, wherein the recovering step comprises ending of the turning-off of the MOS power transistors in correspondence with the end of the generation of the interrupt signal, a recovery of the normal operation of the converter occurring in an automatic way once the interrupt signal has ended.

8. A controller for a converter of the multiphase interleaving type, the controller comprising:

at least one error amplifier having a first input terminal coupled to a first inner terminal of the controller, a second input terminal receiving a reference voltage, and an output terminal coupled to a second inner terminal of the controller;

a plurality of control modules coupled in parallel between first and second voltage references, each of the control modules having an output terminal coupled to a phase of the converter, the first inner terminal being coupled to a terminal of the converter by a first resistor and the second inner terminal being feedback coupled to the first inner terminal by the series of a resistor and a capacitor and being suitable for supplying an inner signal;

at least one detector of a change of a load applied to the terminal of the converter;

first and second generator blocks for generating a pulse for the converter; and first and second output comparators each including an input terminal coupled to the detector and an output terminal coupled to one of the first and second generator blocks, the first generator block supplying the controller with a first pulse indicative of a positive load change and the second generator block supplying the controller with a second pulse indicative of a negative load change.

9. The controller according to claim 8, wherein the detector comprises a threshold derivator circuit that is sensitive to a derivative of a voltage signal on the terminal of the converter.

10. The controller according to claim 9, wherein the detector comprises an operational amplifier having a first input terminal coupled to a first input terminal of the detector, a second input terminal coupled to the second inner terminal of the controller, and an output terminal feedback coupled by a resistor to the input terminal of the detector.

11. The controller according to claim 10, further comprising a network including a capacitor and a resistor in series, the network being coupled between the terminal of the converter and the first input terminal of the detector, so as to detect the derivative of the voltage signal present on the terminal of the converter.

12. The controller according to claim 11, wherein the network is sized so as to meet the relation $\frac{1}{2\pi Rd*Cd} > j*Fsw$, where Rd is a resistance value of the resistor of the network, Cd is a capacitance value of the capacitor of the network, and N*Fsw is a frequency value of the voltage signal on the terminal of the converter.

13. The controller according to claim 8, wherein the first output comparator has a first input terminal coupled to the output terminal of the detector, a second input terminal coupled to the input terminal of the detector by a first generator of a reference voltage, and an output terminal coupled to the first generator block, and the second output comparator has a first input terminal coupled to the output terminal of the detector, a second input terminal coupled to the input terminal of the detector by a second generator of the reference voltage, and an output terminal coupled to the second generator block.

14. The controller according to claim 13, wherein the first and second generator blocks each generator impulse signals on the rising edges for positioning PWM driving signals of the phases below the control voltage values.

15. The controller according to claim 14, wherein the first and second generator blocks each comprise:

a flip-flip having an input terminal coupled to the supply voltage reference, a synchronization terminal receiving a synchronization signal, and an output terminal suitable for supplying an impulse signal; and a delay block coupled to a delay terminal of the flip-flip and supplying a delayed value of the synchronization signal.

16. The controller according to claim 14, further comprising a main oscillator for generating the PWM driving signals, the main oscillator being coupled to the first and second generator blocks for receiving the first and second pulses.

17. The controller according to claim 16, wherein the main oscillator comprises:

a first switch coupled between an inner circuit node and a first reference of minimum voltage of the oscillator, the first switch being controlled by a first negated impulse signal;

a second switch coupled to the inner circuit node and to a supply voltage reference by a generator of an oscillator current, the second switch being driven by a first impulse signal;

a capacitor of the oscillator coupled between the inner circuit node and a ground voltage reference;

first and second operational amplifiers having first input terminals coupled to the inner circuit node, respective second input terminals coupled to a second reference of maximum voltage of the oscillator and the first reference of minimum voltage of the oscillator, and output terminals; and first and second logic gates having first input terminals coupled to the output terminals of the first and second operational amplifiers, second input terminals, and output terminals, wherein the first logic gate has its output terminal coupled to the second input terminal of the second logic gate and to an output terminal of the main oscillator, the second logic gate has its output terminal coupled to the second input terminal of the first logic gate, and the main oscillator generates a first impulse signal on the output terminal and a signal of triangular wave in correspondence with the inner circuit node.

18. The controller according to claim 16, further comprising a circuit for generating impulse signals comprising:

a first switch coupled between a first inner circuit node and the first reference of minimum voltage of the oscillator, the first switch being driven by the first impulse generated by the detector;

a generator of a current of the oscillator coupled between the supply voltage reference and the inner circuit node as well as a capacitor of the oscillator coupled between the first inner circuit node and the first reference of minimum voltage of the oscillator;

an input operational amplifier having a first input terminal coupled to the first inner circuit node, a second input terminal coupled to the second reference of maximum voltage of the oscillator, and an output terminal suitable for supplying a driving signal;

a second switch coupled to the first inner circuit node and to a second inner circuit node and driven by the driving signal; and a third switch coupled between the second reference of maximum voltage of the oscillator and the second inner circuit node and driven by a negated value of the driving signal, wherein on the second inner circuit node a variable voltage value is present as a function of the opening and closure of the second and third switches.

19. The controller according to claim 18, wherein the circuit for generating impulse signals further comprises:

a resistive divider comprising first, second, and third resistors connected in series between the second inner circuit node and the first reference of minimum voltage of the oscillator;

first and second output operational amplifiers coupled to the resistive divider and to the main oscillator; and first and second generators of impulse signals coupled to the first and second output operational amplifiers and suitable for supplying first and second impulse signals.

20. The controller according to claim 19, wherein the first output operational amplifier has a first input terminal coupled to a first interconnection circuit node of the second and third resistors of the resistive divider, a second input terminal coupled to the inner circuit node of the main oscillator and receiving the triangular wave, and an output terminal suitable for supplying a first clock signal to the first generator of impulse signals; and the second output operational amplifier has a first input terminal coupled to a second interconnection circuit node of the first and second resistors of the resistive divider, a second input terminal coupled to the inner circuit node of the main oscillator and receiving the triangular wave, and an output terminal suitable for supplying a second clock signal to the second generator of impulse signals.

21. The controller according to claim 20, wherein the first and second generators of impulse signals act on the falling edges of the first and second synchronization signals received by the first and second output operational amplifiers.

22. The controller according to claim 21, wherein the first and second generators of impulse signals each comprise:

a flip-flip having an input terminal coupled to the supply voltage reference, a synchronization terminal receiving a negated value of a synchronization signal, and an output terminal suitable for supplying an impulse signal; and a delay block coupled to a delay terminal of the flip-flip and supplying a delayed value of the negated value of the synchronization signal.

23. The controller according to claim 20, further comprising a circuit for generating ramp signals to be used as PWM driving signals, the circuit for generating ramp signals comprising:

a first switch coupled between a first inner circuit node and the second reference of maximum voltage of the oscillator and driven by the first pulse which indicates that an application of the load is in progress or by the impulse signal generated by the generator circuit of impulse signals;

a generator of a current of the oscillator coupled between the supply voltage reference and the first inner circuit node; and a capacitor of the oscillator coupled between the first inner circuit node and the second reference of maximum voltage of the oscillator, wherein the circuit for generating ramp signals supplies on the first inner circuit node a ramp signal, which is zeroed, when the first pulse or the impulse signal generated by the generator circuit of impulse signals has been received.

24. The controller according to claim 23, further comprising a circuit for generating a turn-off signal, the circuit for generating the turn-off signal comprising:

a first switch coupled between a first inner circuit node and the second reference of maximum voltage of oscillation and driven by the second pulse;

a generator of a current of the oscillator coupled between the inner circuit node and the ground reference;

a capacitor of the oscillator coupled between the first inner circuit node and the ground reference; and an operational amplifier having a first input terminal coupled to the second inner terminal of the controller, a second input terminal coupled to the first inner circuit node, and an output terminal suitable for supplying a turn-off signal, wherein the circuit for generating the turn-off signal generates on the first inner circuit node a ramp signal which is carried from a value equal to the ground reference to a value equal to the reference of maximum voltage of oscillation at the receipt of the second pulse, the first inner circuit node discharging itself with a constant current equal to the current of the oscillator, and the operational amplifier compares the ramp signal with the inner signal for producing the turn-off signal, which indicates how long the phases of the converter must remain off.

* * * * *